US009277068B2

(12) United States Patent
Selvaraj et al.

(10) Patent No.: US 9,277,068 B2
(45) Date of Patent: Mar. 1, 2016

(54) METADATA SUPPORT IN A DISTRIBUTED SCAN SYSTEM

(71) Applicants: Senthil K. Selvaraj, Cupertino, CA (US); Jiang Hong, San Jose, CA (US); Kenji Niimura, Santa Clara, CA (US)

(72) Inventors: Senthil K. Selvaraj, Cupertino, CA (US); Jiang Hong, San Jose, CA (US); Kenji Niimura, Santa Clara, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/518,299

(22) Filed: Oct. 20, 2014

(65) Prior Publication Data

US 2015/0036163 A1  Feb. 5, 2015

Related U.S. Application Data

(62) Division of application No. 13/786,455, filed on Mar. 6, 2013, now Pat. No. 8,867,080.

(51) Int. Cl.
*H04N 1/00* (2006.01)
*G06F 3/0487* (2013.01)
*G06F 3/0484* (2013.01)
*H04N 1/44* (2006.01)

(52) U.S. Cl.
CPC ........ *H04N 1/00474* (2013.01); *G06F 3/04847* (2013.01); *H04N 1/00225* (2013.01); *H04N 1/00244* (2013.01); *H04N 1/00464* (2013.01); *H04N 1/00503* (2013.01); *H04N 1/00811* (2013.01); *H04N 1/00854* (2013.01); *H04N 1/00973* (2013.01); *H04N 1/444* (2013.01); *H04N 1/4413* (2013.01); *H04N 1/4426* (2013.01); *H04N 1/4433* (2013.01); *H04N 2201/0081* (2013.01); *H04N 2201/0082* (2013.01); *H04N 2201/3246* (2013.01); *H04N 2201/3278* (2013.01)

(58) Field of Classification Search
None
See application file for complete search history.

(56) References Cited

U.S. PATENT DOCUMENTS 8,572,752 B2   10/2013  Ma et al.
2002/0131059 A1  9/2002  Tsuchitoi (Continued)

FOREIGN PATENT DOCUMENTS

EP   2 015 554 A1   1/2009
EP   2015554 A1     1/2009

(Continued)

OTHER PUBLICATIONS

Hameed: "Windows 7/ Windows Server 2008 R2: Distributed Scan Management", dated Oct. 11, 2009, 4 pages.

(Continued)

*Primary Examiner* — Ming Hon
(74) *Attorney, Agent, or Firm* — Hickman Palermo Becker Bingham LLP; Daniel D. Ledesma

(57) ABSTRACT

Approaches are provided for processing scan data based on a scan process definition (SPD) that defines a set of instructions for acquiring image data based on one or more printed documents. An SPD may include extension data that is used to store additional data in association with the scan data. An SPD may include rights management data that is used to provide security to the scan data that is generated based on the SPD. An SPD may be used as a print process definition for dictating how print operations are to be performed. An SPD may be associated with data that identifies one or more scan devices that are prohibited from using the SPD. An SPD may be associated with access delegation data that indicates one or more users who have been delegated access to the SPD.

26 Claims, 25 Drawing Sheets

(56) References Cited

U.S. PATENT DOCUMENTS

| | | | |
|---|---|---|---|
| 2002/0191200 A1* | 12/2002 | Sakai et al. | 358/1.1 |
| 2004/0133598 A1 | 7/2004 | Dobrowski et al. | |
| 2006/0293765 A1 | 12/2006 | Tanaka et al. | |
| 2007/0047006 A1 | 3/2007 | Sakai | |
| 2007/0083935 A1 | 4/2007 | Uchikawa et al. | |
| 2007/0127069 A1 | 6/2007 | Steele et al. | |
| 2008/0022212 A1 | 1/2008 | Kodimer et al. | |
| 2008/0037049 A1* | 2/2008 | Bahl et al. | 358/1.13 |
| 2008/0212131 A1 | 9/2008 | Osada | |
| 2008/0259380 A1 | 10/2008 | Nuggehalli | |
| 2009/0174897 A1 | 7/2009 | Sato | |
| 2009/0193499 A1 | 7/2009 | Srivastava et al. | |
| 2009/0240697 A1 | 9/2009 | Fenelon | |
| 2009/0316208 A1 | 12/2009 | Watanabe et al. | |
| 2010/0094639 A1 | 4/2010 | Rhoads | |
| 2010/0110471 A1* | 5/2010 | Inoue | 358/1.14 |
| 2010/0110485 A1 | 5/2010 | Watariuchi | |
| 2010/0110486 A1* | 5/2010 | Takano | 358/1.15 |
| 2010/0188712 A1 | 7/2010 | Makishima et al. | |
| 2010/0208283 A1 | 8/2010 | Mori et al. | |
| 2010/0245909 A1 | 9/2010 | Yamaguchi | |
| 2010/0302582 A1 | 12/2010 | Yoshimura | |
| 2010/0306775 A1 | 12/2010 | Appiah et al. | |
| 2011/0051182 A1 | 3/2011 | Sugiyama | |
| 2011/0125781 A1 | 5/2011 | Kasahara | |
| 2011/0131513 A1 | 6/2011 | Yamatoto | |
| 2011/0149352 A1 | 6/2011 | Ding | |
| 2012/0002243 A1 | 1/2012 | Merna et al. | |
| 2012/0050790 A1 | 3/2012 | Hong | |
| 2012/0327446 A1* | 12/2012 | Fukasawa | H04N 1/00344 358/1.13 |
| 2014/0253933 A1 | 9/2014 | Selvaraj et al. | |
| 2014/0253941 A1 | 9/2014 | Selvaraj | |
| 2014/0253942 A1 | 9/2014 | Selvaraj | |
| 2014/0254795 A1 | 9/2014 | Selvaraj | |
| 2014/0258500 A1 | 9/2014 | Selvaraji | |
| 2015/0116745 A1 | 4/2015 | Niimura et al. | |

FOREIGN PATENT DOCUMENTS

| | | |
|---|---|---|
| EP | 2 421 228 A1 | 2/2012 |
| EP | 2421228 A1 | 2/2012 |

OTHER PUBLICATIONS

European Patent Office, "Search Report" in application No. 14157499.6-1903, dated Feb. 12, 2015, 10 pages.

Zhang et al., "A Rule-based Framework for Role-based Delegation and Revocation", ACM Transactions on Information and System Security, vol. 6, No. 3, dated Aug. 1, 2003, 38 pages.

Krzysztof Pytko: "Active Directory rights delegation-overview", iSiek's blog about Microsoft Windows Services, dated May 16, 2012, 16 pages.

Hameed: Windows 7/Windows Server 2008, R2: Distributed Scan Management, dated Oct. 11, 2009, 4 pages.

Hameed: "Windows Server 2008 R2: Distributed Scan Management", dated Oct. 11, 2009, 4 pages.

European Patent Office, "Search Report" in application No. 14158031.6-1955, dated May 22, 2014, 9 pages.

European Patent Office, "Search Report" in application No. 14157991.2-1955, dated May 22, 2014, 9 pages.

* cited by examiner

```xml
<?xml version="1.0"?>
<psp:PostScanProcess xmlns:wscn="http://schemas.microsoft.com/windows/2006/08/wdp/scan"
  xmlns:psp="http://schemas.microsoft.com/windows/2008/02/imaging/postscan/psp">
  <psp:ScanRepository>WIN-9V2HTUID7VU.etdtest.com</psp:ScanRepository>
  <psp:ScanTicket>
    <wscn:JobDescription>
      <wscn:JobName>Choice-Admin</wscn:JobName>
      <wscn:JobOriginatingUserName>00000000002B8910</wscn:JobOriginatingUserName>
      <wscn:JobInformation/>
    </wscn:JobDescription>
    <wscn:DocumentParameters>
      <wscn:Format wscn:MustHonor="false">xps</wscn:Format>
      <wscn:MediaSides>
        <wscn:MediaFront>
          <wscn:ColorProcessing wscn:MustHonor="false">BlackAndWhite1</wscn:ColorProcessing>
          <wscn:Resolution wscn:MustHonor="false">
            <wscn:Width>100</wscn:Width>
            <wscn:Height>100</wscn:Height>
          </wscn:Resolution>
        </wscn:MediaFront>
      </wscn:MediaSides>
    </wscn:DocumentParameters>
  </psp:ScanTicket>
  <psp:PostScanInstructions>
    <psp:ContinueOnError>true</psp:ContinueOnError>
    <psp:DocumentRootName>ChoiceAdmin</psp:DocumentRootName>
    <psp:FiltersToProcess>
      <psp:Filter>
        <psp:Dialect>http://schemas.microsoft.com/windows/2007/10/imaging/postscan/filter/fileshare</psp:Dialect>
        <psp:Instructions>
          <fsf:FileShareConfig xmlns:fsf="http://schemas.microsoft.com/windows/2007/10/imaging/postscan/filter/fileshare">
            <fsf:FileShares>
              <fsf:ShareUNC>c:\Scanned-Admin</fsf:ShareUNC>
            </fsf:FileShares>
          </fsf:FileShareConfig>
        </psp:Instructions>
      </psp:Filter>
      <psp:Filter>
        <psp:Dialect>http://schemas.microsoft.com/windows/2007/10/imaging/postscan/filter/email</psp:Dialect>
        <psp:Instructions>
          <emlf:EmailConfig xmlns:emlf="http://schemas.microsoft.com/windows/2007/10/imaging/postscan/filter/email">
            <emlf:SendToScanUser>false</emlf:SendToScanUser>
            <emlf:SendToAddresses emlf:CanAddAddresses="true">
              <emlf:EmailAddress>nancy@etdtest.com</emlf:EmailAddress>
            </emlf:SendToAddresses>
          </emlf:EmailConfig>
        </psp:Instructions>
      </psp:Filter>
      <psp:Filter>
        <psp:Dialect>http://schemas.microsoft.com/windows/2007/10/imaging/postscan/filter/sharepoint</psp:Dialect>
        <psp:Instructions>
          <spf:SharePointConfig xmlns:spf="http://schemas.microsoft.com/windows/2007/10/imaging/
                  postscan/filter/sharepoint">
            <spf:SaveToMySite>false</spf:SaveToMySite>
            <spf:SaveToSharePointSites>
              <spf:SaveToSharePointSiteURL>http://AdminSharePoint</spf:SaveToSharePointSiteURL>
            </spf:SaveToSharePointSites>
          </spf:SharePointConfig>
        </psp:Instructions>
      </psp:Filter>
    </psp:FiltersToProcess>
  </psp:PostScanInstructions>
</psp:PostScanProcess>
```

*FIG. 7*

```xml
<?xml version="1.0" ?>
<psp:PostScanProcess xmlns:psp="http://schemas.microsoft.com/windows/2008/02/imaging/postscan/psp"
    xmlns:wscn="http://schemas.microsoft.com/windows/2006/08/wdp/scan"
    xmlns:ihv="http://schemas.abcd.com/expense">
    <psp:ScanRepository>WIN-9V2HTUID7VU.etdtest.com</psp:ScanRepository>
    <psp:ScanTicket>
        <wscn:JobDescription>
            <wscn:JobName>BW100-Legal</wscn:JobName>
            <wscn:JobOriginatingUserName>00000000002EB8C0</wscn:JobOriginatingUserName>
            <wscn:JobInformation />
        </wscn:JobDescription>
        <wscn:DocumentParameters>
            <wscn:Format wscn:MustHonor="false">tiff-single-g4</wscn:Format>
            <wscn:MediaSides>
                <wscn:MediaFront>
                    <wscn:ColorProcessing wscn:MustHonor="true">BlackAndWhite1</wscn:ColorProcessing>
                    <wscn:Resolution wscn:MustHonor="true">
                        <wscn:Width>100</wscn:Width>
                        <wscn:Height>100</wscn:Height>
                    </wscn:Resolution>
                </wscn:MediaFront>
            </wscn:MediaSides>
        </wscn:DocumentParameters>
    </psp:ScanTicket>
    <psp:PostScanInstructions>
        <psp:ContinueOnError>true</psp:ContinueOnError>
        <psp:DocumentRootName>legal</psp:DocumentRootName>
        <psp:FiltersToProcess>
            <psp:Filter>
                <psp:Dialect>http://schemas.microsoft.com/windows/2007/10/imaging/postscan/filter/fileshare
                </psp:Dialect>
                <psp:Instructions>
                    <fsf:FileShareConfig xmlns:fsf="http://schemas.microsoft.com/windows/2007/10/
                        imaging/postscan/filter/fileshare">
                        <fsf:FileShares>
                            <fsf:ShareUNC>c:\Scanned-Legal</fsf:ShareUNC>
                            <ihv:url>http://www.abcd.com/expense/receiptStore/submit.html</ihv:url>
                            <ihv:expense-report-id>3321455</ihv:expense-report-id>
                            <ihv:comment></ihv:comment>
                        </fsf:FileShares>
                    </fsf:FileShareConfig>
                </psp:Instructions>
            </psp:Filter>
        </psp:FiltersToProcess>
    </psp:PostScanInstructions>
</psp:PostScanProcess>
```

*FIG. 9*

```xml
<?xml version="1.0" ?>
<psp:PostScanProcess xmlns:psp="http://schemas.microsoft.com/windows/2008/02/imaging/postscan/psp"
    xmlns:wscn="http://schemas.microsoft.com/windows/2006/08/wdp/scan" xmlns:ihv="http://schemas.abcd.com/expense">
    <psp:ScanRepository>WIN-9V2HTUID7VU.etdtest.com</psp:ScanRepository>
    <psp:ScanTicket>
        <wscn:JobDescription>
            <wscn:JobName>BW100-Legal</wscn:JobName>
            <wscn:JobOriginatingUserName>00000000002EB8C0</wscn:JobOriginatingUserName>
            <wscn:JobInformation />
        </wscn:JobDescription>
        <wscn:DocumentParameters>
            <wscn:Format wscn:MustHonor="false">tiff-single-g4</wscn:Format>
            <wscn:MediaSides>
                <wscn:MediaFront>
                    <wscn:ColorProcessing wscn:MustHonor="true">BlackAndWhite1</wscn:ColorProcessing>
                    <wscn:Resolution wscn:MustHonor="true">
                        <wscn:Width>100</wscn:Width>
                        <wscn:Height>100</wscn:Height>
                    </wscn:Resolution>
                </wscn:MediaFront>
            </wscn:MediaSides>
        </wscn:DocumentParameters>
    </psp:ScanTicket>
    <psp:PostScanInstructions>
        <psp:ContinueOnError>true</psp:ContinueOnError>
        <psp:DocumentRootName>legal</psp:DocumentRootName>
        <psp:FiltersToProcess>
            <psp:Filter>
                <psp:Dialect>http://schemas.microsoft.com/windows/2007/10/imaging/postscan/filter/fileshare
                </psp:Dialect>
                <psp:Instructions>
                    <fsf:FileShareConfig
                        xmlns:fsf="http://schemas.microsoft.com/windows/2007/10/imaging/postscan/filter/fileshare">
                        <fsf:FileShares>
                            <fsf:ShareUNC>c:\Scanned-Legal</fsf:ShareUNC>
                            <ihv:rsm-policy-id>everyone-read-only</ihv:rsm-policy-id>
                        </fsf:FileShares>
                    </fsf:FileShareConfig>
                </psp:Instructions>
            </psp:Filter>
        </psp:FiltersToProcess>
    </psp:PostScanInstructions>
</psp:PostScanProcess>
```

*FIG. 10*

```xml
<?xml version="1.0" ?>
<psp:PostScanProcess xmlns:psp="http://schemas.microsoft.com/windows/2008/02/imaging/postscan/psp"
    xmlns:wscn="http://schemas.microsoft.com/windows/2006/08/wdp/scan" xmlns:ihv="http://schemas.abcd.com/expense">
  <psp:ScanRepository>WIN-9V2HTUID7VU.etdtest.com</psp:ScanRepository>
  <psp:ScanTicket>
    <wscn:JobDescription>
      <wscn:JobName>BW100-Legal</wscn:JobName>
      <wscn:JobOriginatingUserName>00000000002EB8C0</wscn:JobOriginatingUserName>
      <wscn:JobInformation />
    </wscn:JobDescription>
    <wscn:DocumentParameters>
      <wscn:Format wscn:MustHonor="false">tiff-single-g4</wscn:Format>
      <wscn:MediaSides>
        <wscn:MediaFront>
          <wscn:ColorProcessing wscn:MustHonor="true">BlackAndWhite1</wscn:ColorProcessing>
          <wscn:Resolution wscn:MustHonor="true">
            <wscn:Width>100</wscn:Width>
            <wscn:Height>100</wscn:Height>
          </wscn:Resolution>
        </wscn:MediaFront>
      </wscn:MediaSides>
    </wscn:DocumentParameters>
  </psp:ScanTicket>
  <psp:PostScanInstructions>
    <psp:ContinueOnError>true</psp:ContinueOnError>
    <psp:DocumentRootName>legal</psp:DocumentRootName>
    <psp:FiltersToProcess>
      <psp:Filter>
        <psp:Dialect>http://schemas.microsoft.com/windows/2007/10/imaging/postscan/filter/fileshare</psp:Dialect>
        <psp:Instructions>
          <fsf:FileShareConfig
            xmlns:fsf="http://schemas.microsoft.com/windows/2007/10/imaging/postscan/filter/fileshare">
            <fsf:FileShares>
              <fsf:ShareUNC>c:\Scanned-Legal</fsf:ShareUNC>
            </fsf:FileShares>
            <ihv:devices>
              <ihv:device-uuid>01-23-45-67-89-AB-CD-EF</ihv:device-uuid>
              <ihv:device-uuid>01-23-45-67-89-AB-CD-EG</ihv:device-uuid>
            </ihv:devices>
          </fsf:FileShareConfig>
        </psp:Instructions>
      </psp:Filter>
    </psp:FiltersToProcess>
  </psp:PostScanInstructions>
</psp:PostScanProcess>
```

*FIG. 16*

```xml
<?xml version="1.0" ?>
<psp:PostScanProcess xmlns:psp="http://schemas.microsoft.com/windows/2008/02/imaging/postscan/psp"
    xmlns:wscn="http://schemas.microsoft.com/windows/2006/08/wdp/scan" xmlns:ihv="http://schemas.abcd.com/expense">
    <psp:ScanRepository>WIN-9V2HTUID7VU.etdtest.com</psp:ScanRepository>
    <psp:ScanTicket>
        <wscn:JobDescription>
            <wscn:JobName>BW100-Legal</wscn:JobName>
            <wscn:JobOriginatingUserName>00000000002EB8C0</wscn:JobOriginatingUserName>
            <wscn:JobInformation />
        </wscn:JobDescription>
        <wscn:DocumentParameters>
            <wscn:Format wscn:MustHonor="false">tiff-single-g4</wscn:Format>
            <wscn:MediaSides>
                <wscn:MediaFront>
                    <wscn:ColorProcessing wscn:MustHonor="true">BlackAndWhite1</wscn:ColorProcessing>
                    <wscn:Resolution wscn:MustHonor="true">
                        <wscn:Width>100</wscn:Width>
                        <wscn:Height>100</wscn:Height>
                    </wscn:Resolution>
                </wscn:MediaFront>
            </wscn:MediaSides>
        </wscn:DocumentParameters>
    </psp:ScanTicket>
    <psp:PostScanInstructions>
        <psp:ContinueOnError>true</psp:ContinueOnError> <psp:DocumentRootName>legal</psp:DocumentRootName>
        <psp:FiltersToProcess>
            <psp:Filter>
                <psp:Dialect>http://schemas.microsoft.com/windows/2007/10/imaging/postscan/filter/fileshare</psp:Dialect>
                <psp:Instructions>
                    <fsf:FileShareConfig
                        xmlns:fsf="http://schemas.microsoft.com/windows/2007/10/imaging/postscan/filter/fileshare">
                        <fsf:FileShares> <fsf:ShareUNC>c:\Scanned-Legal</fsf:ShareUNC> </fsf:FileShares>
                    </fsf:FileShareConfig>
                </psp:Instructions>
                <ihv:delegates-info>
                    <ihv:delegate>
                        <ihv:login-user>Assistant-A</ihv:login-user>
                        <ihv:delegate-from>Boss-A, Boss-B</ihv:delegate-from>
                        <ihv:access-right>delegate-only,read-only</ihv:access-right>
                    </ihv:delegate>
                    <ihv:delegate>
                        <ihv:login-user>Assistant-D</ihv:login-user>
                        <ihv:delegate-from>Boss-E, Boss-F</ihv:delegate-from>
                        <ihv:access-right>read-only</ihv:access-right>
                    </ihv:delegate>
                </ihv:delegates-info>
            </psp:Filter>
        </psp:FiltersToProcess>
    </psp:PostScanInstructions>
</psp:PostScanProcess>
```

*FIG. 21*

METADATA SUPPORT IN A DISTRIBUTED SCAN SYSTEM

CROSS-REFERENCE TO RELATED APPLICATIONS; BENEFIT CLAIM

This application is a divisional of U.S. patent application Ser. No. 13/786,455, filed Mar. 6, 2013, the entire contents of which is hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application; which is related to:

U.S. patent application Ser. No. 13/786,456, entitled, "RIGHTS MANAGEMENT IN A DISTRIBUTED SCAN SYSTEM" filed Mar. 6, 2013; the contents of which are incorporated by reference as if fully set forth herein.

U.S. patent application Ser. No. 13/786,458, entitled, "DISTRIBUTED PRINT MANAGEMENT" filed Mar. 6, 2013, the contents of which are incorporated by reference as if fully set forth herein.

U.S. patent application Ser. No. 13/786,460, entitled, "DEVICE MANAGEMENT IN A DISTRIBUTED SCAN SYSTEM" filed Mar. 6, 2013, the contents of which are incorporated by reference as if fully set forth herein.

U.S. patent application Ser. No. 13/786,461, entitled, "DELEGATE ACCESS IN A DISTRIBUTED SCAN SYSTEM" filed Mar. 6, 2013, the contents of which are incorporated by reference as if fully set forth herein.

FIELD

Embodiments relate generally to distributed scan management, and more specifically, to extending the capabilities of scanning in an enterprise environment.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Managing network devices, especially in a large enterprise environment, has proven to be a difficult task. For example, system administrators who manage network devices, such as scan devices and print devices, may desire to monitor use of the network devices, to restrict access to certain network devices, and to provide security to data that is generated by the network devices. Current approaches lack many features that would increase versatility and usability of the network devices.

SUMMARY

Approaches are described for processing scan process definitions. In one embodiment, user identification data that identifies a user of a scan device is received at the scan device. Data that at least identifies one or more scan process definitions that correspond to the user identification data is retrieved. One or more graphical user interface objects that correspond to the one or more scan process definitions are caused to be displayed on a user interface of the scan device. User input that indicates a selection of a particular user interface object from the one or more user interface objects is received via the user interface. Scan settings data, destination data, and extension data is identified in a particular scan process definition that corresponds to the particular user interface object. At least one or more of the following is performed: a) retrieving data from an external source based upon the extension data and transmitting, to a device that is separate from the scan device, scan data that is generated based on the scan settings data and at least a portion of the data retrieved from the external source, b) using the extension data to generate a graphical user interface and receive user input via the graphical user interface and transmitting to the device that is separate from the scan device, the scan data and at least a portion of the user input, or c) sending, to the device that is separate from the scan device, the scan data and at least a portion of the extension data.

In another embodiment, a graphical user interface (GUI) is generated on an administrator device that has access rights to an active directory server. The GUI allows a user to specify extension data, generate a scan process definition that includes at least the extension data, scan settings data, and destination data that indicates one or more destinations to which scan data generated, based upon the scan settings data, on a scan device that is different than the administrator device, will be sent, and cause the scan process definition to be stored on the active directory server. The extension data specifies one or more of post-scan processing to be performed on the scan data or device settings to be used by the scan device during scanning or printing.

BRIEF DESCRIPTION OF THE DRAWINGS

In the figures of the accompanying drawings like reference numerals refer to similar elements.

FIG. 7 depicts an example scan process definition, in an embodiment;

FIG. 9 depicts an example scan process definition that includes extension data, in an embodiment;

FIG. 10 depicts an example scan process definition that includes rights management data, in an embodiment;

FIG. 16 depicts an example scan process definition that includes device management data, in an embodiment;

FIG. 21 depicts an example scan process definition that includes access delegation data, in an embodiment;

DETAILED DESCRIPTION

Figure 1:
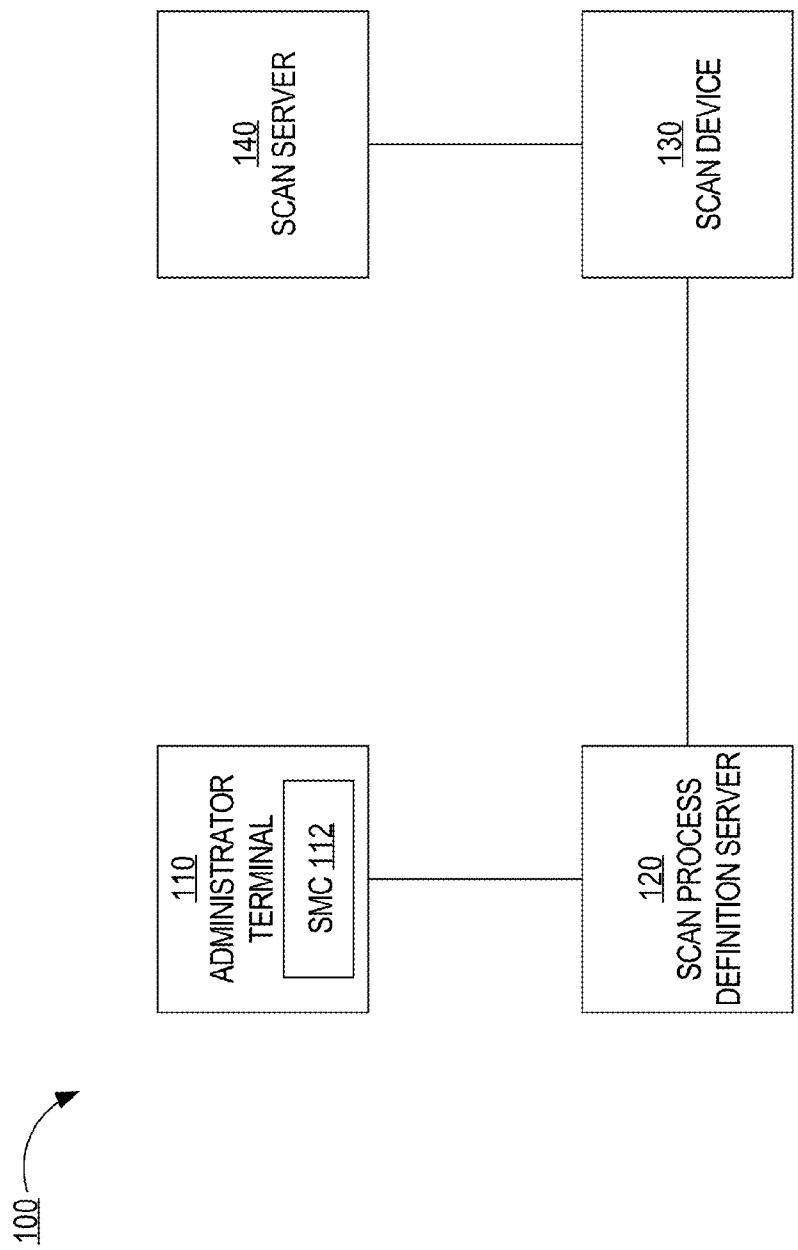
FIG. 1 is a block diagram that depicts an example distributed scan management system, in an embodiment.

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. OVERVIEW
II. SYSTEM ARCHITECTURE
  A. ADMINISTRATOR TERMINAL
  B. SCAN PROCESS DEFINITION
    1. SCAN SETTING DATA
    2. DESTINATION DATA
    3. USER ACCESS RIGHT DATA
    4. EXTENSION DATA
    5. EXAMPLE DEFINITION
  C. DEFINITION SERVER
  D. SCAN DEVICE
  E. SCAN SERVER
  F. EXAMPLE PROCESS
III. METADATA SUPPORT
  A. EXTENSION DATA
  B. PROCESSING EXTENSION DATA
    1. EXTERNAL SOURCE
      i) EXAMPLE SCENARIO
    2. USER INPUT
    3. PASS THROUGH DATA
IV. RIGHTS MANAGEMENT SERVICE
  A. SOURCES OF RIGHTS MANAGEMENT DATA
  B. PRE-SCAN SERVER APPROACH
  B. POST-SCAN SERVER APPROACH
V. EXTEND SCAN MANAGEMENT SYSTEM FOR PRINTING
  A. ADMINISTRATOR TERMINAL
  B. PRINT PROCESS DEFINITION
  C. DEFINITION SERVER
  D. PRINT DEVICE
  E. PRINT SERVER
  F. SERVICES THAT LEVERAGE PRINT JOB COMPLETION DATA
  G. EXTENDING SCAN MANAGEMENT SYSTEM TO OTHER CONTEXTS
VI. DEVICE MANAGEMENT
  A. DEVICE MANAGEMENT DATA
  B. STORING DEVICE MANAGEMENT DATA
  C. PROCESSING DEVICE MANAGEMENT DATA
    1. POST-SCAN PROCESSING OF DEVICE MANAGEMENT DATA
    2. PRE-SCAN PROCESSING OF DEVICE MANAGEMENT DATA
      i) DEFINITION SERVER PROCESSES DEVICE MANAGEMENT DATA
      Ii) SCAN DEVICE PROCESSES DEVICE MANAGEMENT DATA
VII. DELEGATE ACCESS
  A. ACCESS DELEGATION DATA
    1. STORED IN A SCAN PROCESS DEFINITION
    2. STORED SEPARATE FROM A SCAN PROCESS DEFINITION
  B. PROCESSING ACCESS DELEGATION DATA
    1. DEFINITION SERVER ENFORCES ACCESS DELEGATION DATA
    2. SCAN DEVICE ENFORCES ACCESS DELEGATION DATA
VIII. IMPLEMENTATION MECHANISMS

I. Overview

Techniques are provided for extending the functionality of a distributed scan management (DSM) system. The DSM system involves the use of scan process definitions, each of which defines a set of instructions for acquiring image data. A scan process definition may also include user access right data that indicates one or more users who are allowed to use the scan process definition when performing a scan operation relative to one or more printed documents. A scan process definition may also include destination data that identifies one or more destinations to which scan data (that is generated based on the scan process definition) is to be stored.

In one technique, a scan process definition includes extension data that is used by a scan device to dictate what information is stored in association with scan data or how scan data is to be processed. For example, extension data indicates a source data that identifies a source to which a scan device is to send a request for information. The scan device receives the requested information and associates the requested information with scan data. As another example, a scan device reads the extension data and generates a user interface to prompt a user of the scan device to enter information, which is later associated with scan data that is generated at the scan device. As another example, the scan device reads the extension data and associates the extension data with scan data that the scan device generates. The scan data and any associated data are sent to another device for further processing.

In another technique, a set of scan instructions includes rights management data that is used to provide security to scan data generated by a scan device.

In another technique, a distributed print management (DPM) system is described, which system leverages the concepts and principles of a DSM system. For example, a print process definition defines a set of instructions for performing a print operation with respect to print data that represents an electronic document in order to generated one or more printed documents.

In another technique, a scan process definition is associated with a set of one or more scan devices that are allowed to use the scan process definition to perform a scan operation. Any scan device that is outside that set either is not allowed to use the scan process definition or has one or more other restrictions associated with the scan process definition, such as when the scan process definition can be used, what destinations may receive scan data that is to be generated based on the scan process destination, and what scan settings in the scan process definition may be changed.

In another technique, access delegation data is associated with a scan process definition. The access delegation data is separate from any user access right data that might be associated with (e.g., included in) the scan process definition. The access delegation data is used to allow a user who is not otherwise allowed to use the scan process definition to use the scan process definition. However, one or more restrictions may be applied in order to limit the functions or operations that can be performed with respect to the scan process definition, such as whether a different destination may be specified, etc.

II. System Architecture

FIG. 1 is a block diagram that depicts an example distributed scan management (DSM) system 100. DSM system 100 includes an administrator terminal 110, a scan process definition server 120 (or "definition server 120" for short), a scan device 130, and a scan server 140. Although only one scan device is depicted in FIG. 1, system 100 may include multiple scan devices that are communicatively coupled to definition server 120 and scan server 140.

A. Administrator Terminal

Administrator terminal 110 is a computing device that includes a scan management console (SMC) 112 that is configured to allow a user or administrator to define scan process definitions and/or edit existing scan process definitions. Example computing devices include, without limitation, a server, a desktop computer, a laptop computer, or a tablet computer.

A scan process definition defines a set of instructions for acquiring and processing image data. A scan device uses a scan process definition to perform a scan operation with respect to one or more printed documents. Scan process definitions are described in more detail below.

SMC 112 may be implemented in software, hardware, or any combination of software and hardware. In an embodiment, SMC 112 is part of the Microsoft Management Console (MMC) Windows Server technology.

Administrator terminal 110 is communicatively coupled to definition server 120 and, optionally, to scan device 130 and/or scan server 140. Although administrator terminal 110 is depicted as directly connected to definition server 120, one or more devices or networks may reside in the shortest communication path between administrator terminal 110 and definition server 120 and between administrator terminal 110 and scan server 140.

Although not depicted, administrator terminal 110 may be communicatively coupled to scan device 130. In such an embodiment, SMC 112 is configured to discover scan devices in a network. As part of the discovery process, SMC 112 may retrieve, from a scan device, a status of the scan device, elements/capabilities of the scan device, and device configuration information of the scan device. After an administrator creates, for a discovered scan device, a scan ticket (that indicates scan settings that can be used by the discovered scan device), SMC 112 may send the scan ticket to the scan device and request the scan device to validate the scan ticket. If SMC 112 receives, from the scan device, validation data that indicates that the scan ticket is valid, then SMC 112 causes a scan process definition that includes scan settings data from the scan ticket to be stored in definition server 120.

In an embodiment, SMC 112 implements a standard protocol to communicate with scan device 130. A non-limiting example of a standard protocol is the Distributed Scan Device Web Service (WS-DSD) protocol. This protocol uses a subset of the XML schema elements defined in the WS Scan Service specification. The various elements depicted in FIG. 1 may communicate with each other either through direct communications links or via one or more networks, for example, local area networks, wide area networks and packet-switched networks, such as the Internet. In addition, the various elements depicted in FIG. 1 may be implemented on one or more physical computing devices that may vary depending upon a particular implementation. As one non-limiting example, the administrative terminal 110 and the definition server 120 may be co-located on the same computing device. As another non-limiting example, the administrative terminal 110 and the scan server 140 may be co-located on a computing device.

Figure 2:
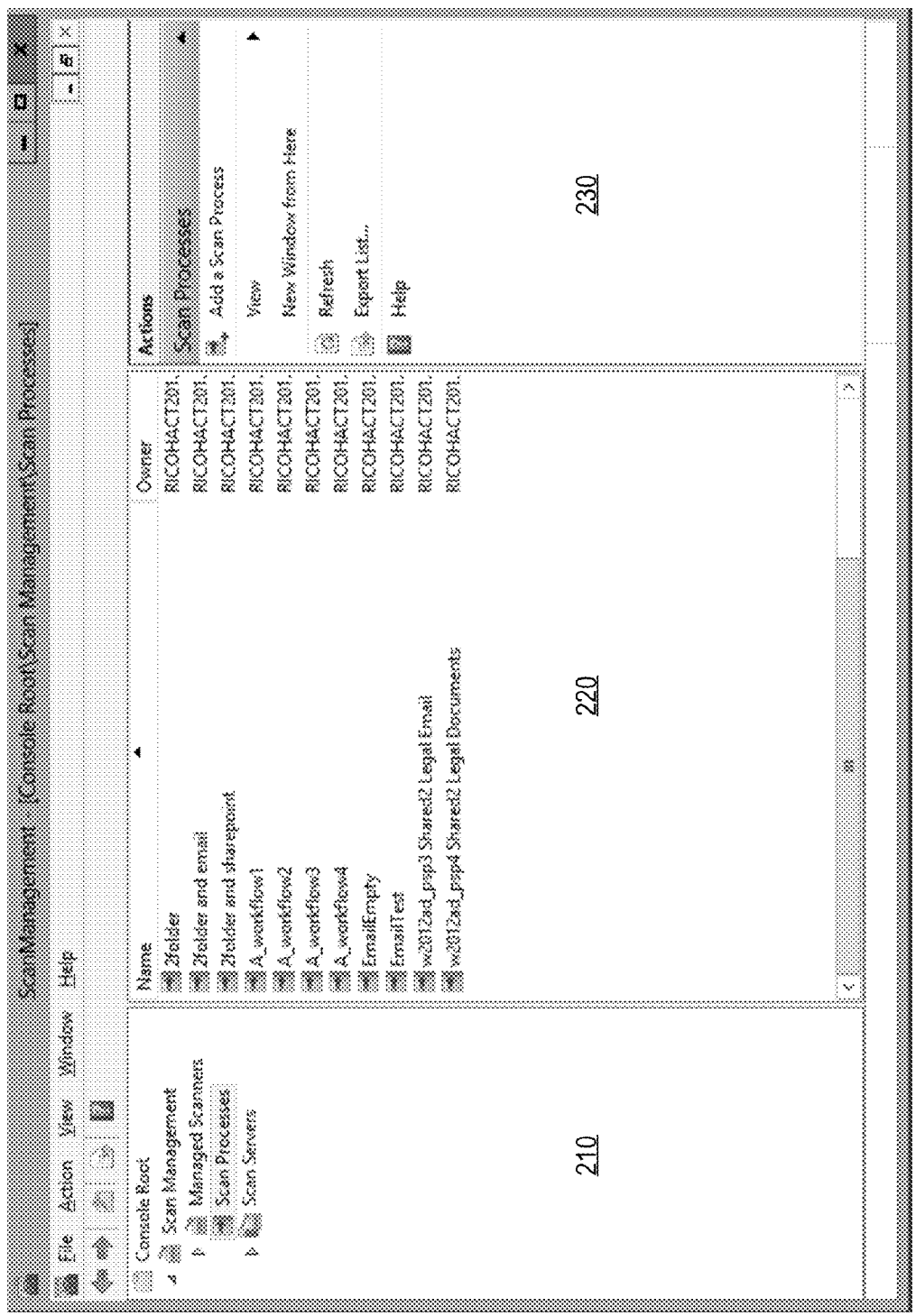
FIG. 2 is a diagram that depicts an example graphical user interface allows a user to select or create a new scan process definition, in an embodiment.

FIG. 2 is a diagram that depicts an example graphical user interface 200 provided by SMC 112 to allow a user to select or create a new scan process definition, in an embodiment. Interface 200 includes a directory hierarchy frame 210, a folder contents frame 220, and an action frame 230.

Directory hierarchy frame 210 includes items that correspond to folders in a directory hierarchy 212. In this example, the directory hierarchy 212 includes a folder entitled "Console Root" as the root directory, a folder entitled "Scan Management" as a subfolder of the root directory, and three subfolders of the folder "Scan Management": "Managed Scanners," "Scan Processes," and "Scan Servers." In this example, the folder "Scan Processes" is selected and items within that folder are displayed in folder contents frame 220.

Folder contents frame 220 includes 11 items, each of which corresponds to a different scan process definition.

Action frame 230 includes a list of actions that may be performed with respect to a scan process definition or folder contents frame 220. Such actions include adding a new scan process definition, refreshing frame 220, and exporting scan process definitions listed in frame 220.

B. Scan Process Definition

Figure 3:
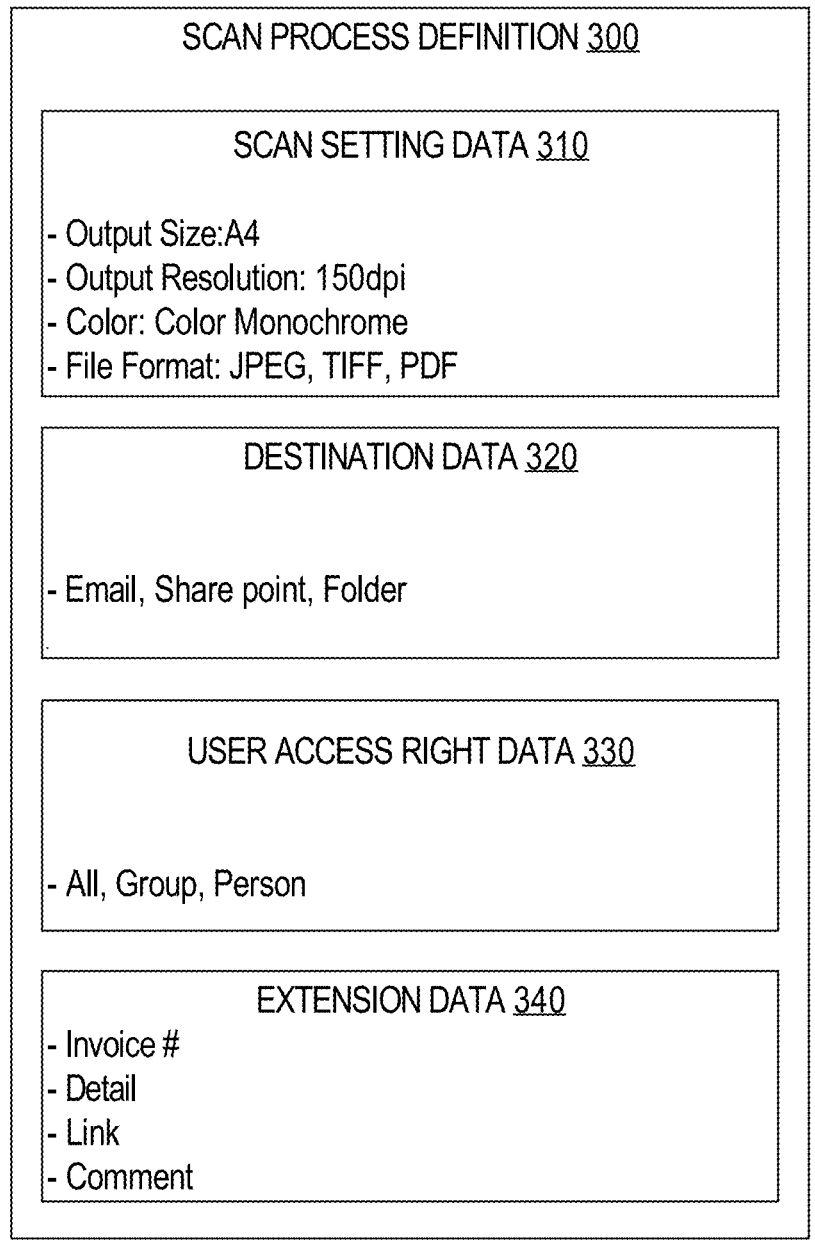
FIG. 3 is a block diagram that depicts an example overview of contents of a scan process definition, in an embodiment.

FIG. 3 is a block diagram that depicts an example overview of contents of a scan process definition 300, in an embodiment. Scan process definition 300 includes scan settings data 310, destination data 320, user access right data 330, and extension data 340. Scan process definition 300 may include other data, depending upon a particular implementation.

1. Scan Settings Data

Scan settings data 310 indicates one or more image-acquisition settings that are used by scan device 130 to generate scan data. For example, scan device 130 may generate scan data by scanning one or more printed documents. As another example, the scan device 130 may generate scan data by receiving application data, e.g., a Word document, and generate scan data from the application data. In this example, scan settings data 310 indicates a size of a file that results from performing a scan operation, a color scheme (e.g., gray scale or color monochrome), and multiple possible file formats of a file that results from performing a scan operation. In this example the possible file formats are JPEG, TIFF, and PDF. For example, if scan device 130 is not configured to generate JPEG images, then scan device 130 may select TIFF (if supported) as the file format of generated scan data.

Figure 4:
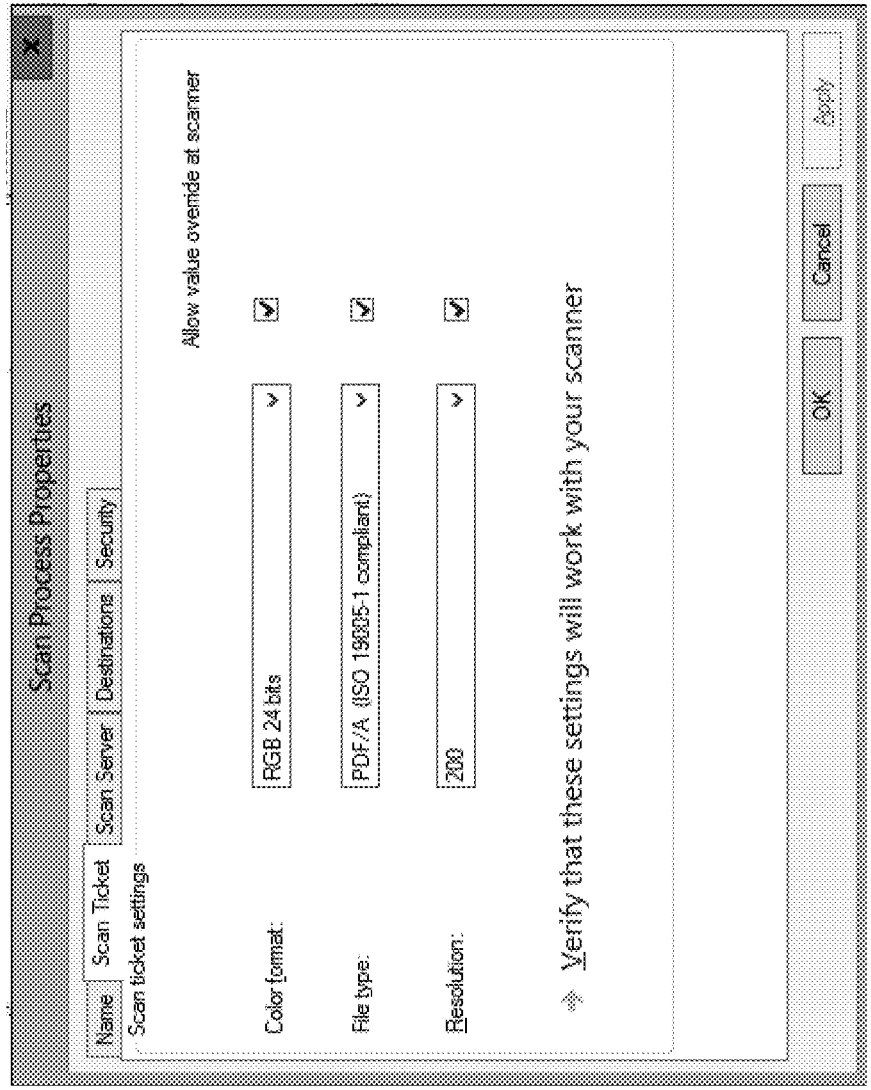
FIG. 4 is a diagram that depicts an example graphical user interface that allows a user to specify settings that will be used by a scan device to perform a scan operation with respect to one or more printed documents, in an embodiment.

FIG. 4 is a diagram that depicts an example graphical user interface 400 that is provided by SMC 112 and that allows a user to specify settings that will be used by a scan device (e.g., scan device 130) to perform a scan operation with respect to one or more printed documents, in an embodiment. Interface 400 includes five tabs: Name, Scan Ticket, Scan Server, Destinations, and Security. In interface 400, the Scan Ticket tab has been selected. In this example, the Scan Ticket tab includes a color format setting, a file type setting, and a resolution setting. In this example, the values for the three settings are, respectively, RGB 24 bits, PDF/A (ISO 19005-1 compliant) and 200. For each setting, there is an option that, when selected, indicates that a user, at a scan device that uses this scan ticket, can change the values for the settings.

2. Destination Data

Destination data 320 indicates one or more destinations for scan data that scan device 130 generates based on scan settings data 310. In this example, destination data 320 indicates multiple destinations, which include email (e.g., a particular email address), SharePoint (which is an example storage service that is outside scan management system 100), and network folder. Scan server 140 (described in more detail below) uses destination data 320 to determine where to store the scan data.

Figure 5:
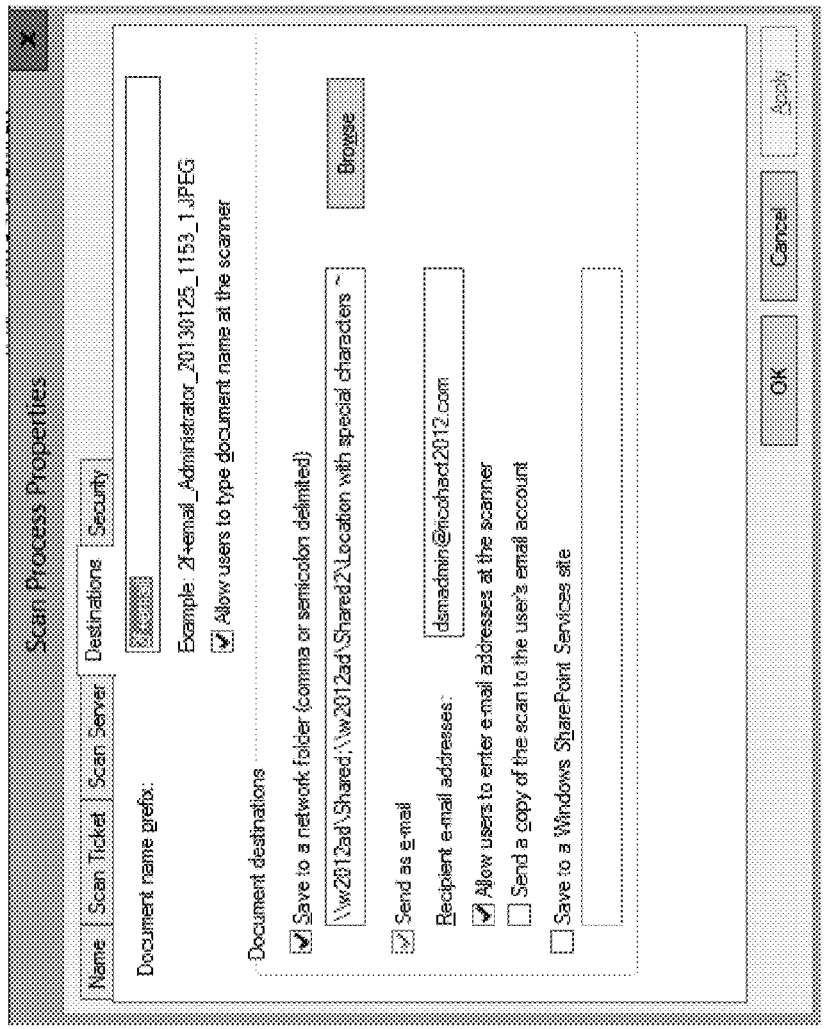
FIG. 5 is a diagram that depicts an example graphical user interface that allows an administrator to specify one or more destinations to which scan data is to be sent, in an embodiment.

FIG. 5 is a diagram that depicts an example graphical user interface 500 that is provided by SMC 112 and that allows an administrator to specify one or more destinations to which scan data (that is to be generated based on the corresponding scan settings) is to be sent, in an embodiment. Interface 500 includes a text field that allows an administrator to specify a name prefix for a scan document generated by a scan device based on the corresponding scan settings.

Interface 500 also includes options that allow an administrator to specify one or more destinations. In this example, there are three types of destinations: a network folder, an email, and a cloud storage service. In a related embodiment, interface 500 allows an administrator to specify multiple network folders, not just one. Also, interface 500 may allow an administrator to specify multiple email addresses, not just one. In this example, interface 500 also provides an option that, when selected, allows a user at a scan device (e.g., scan device 130) to enter one or more email addresses when using the corresponding scan process definition to perform a scan operation.

Interface 500 also allows an "email me" option that, when selected, allows a user (at the scan device) to send a scan image/document to an email account of the user. Email identification data that identifies an email account of the user may be stored at definition server 120 and sent to scan device 130 in response to a request for a scan process definition from scan device 130. Alternatively, email identification data may be stored at scan device 130 and scan device 130 identifies the email account when scan device 130 is about to use a scan process definition that has the "email me" option selected.

In an alternative embodiment, scan process definition 300 does not include destination data. In this embodiment, scan server 140 uses one or more other criteria (described in more detail below) to determine where to store scan data.

3. User Access Right Data

User access right data 330 indicates who is allowed access to scan process definition 300. User access right data 330 may indicate that anyone is able to use scan process definition 300, one or more groups that are allowed to use scan process definition 300, or one or more individuals who are allowed to use scan process definition 300. Thus, if user access right data 330 indicates "All," then any indication of groups or individuals in user access right data 330 may be ignored. User access right data 330 may indicate one or more groups and one or more individuals. Thus, for example, user access right data 330 may indicate user1, user2, and group3 that comprises user1, user4, and user5. Users may be given access to multiple scan process definitions, either directly, or by association with groups.

Figure 6:
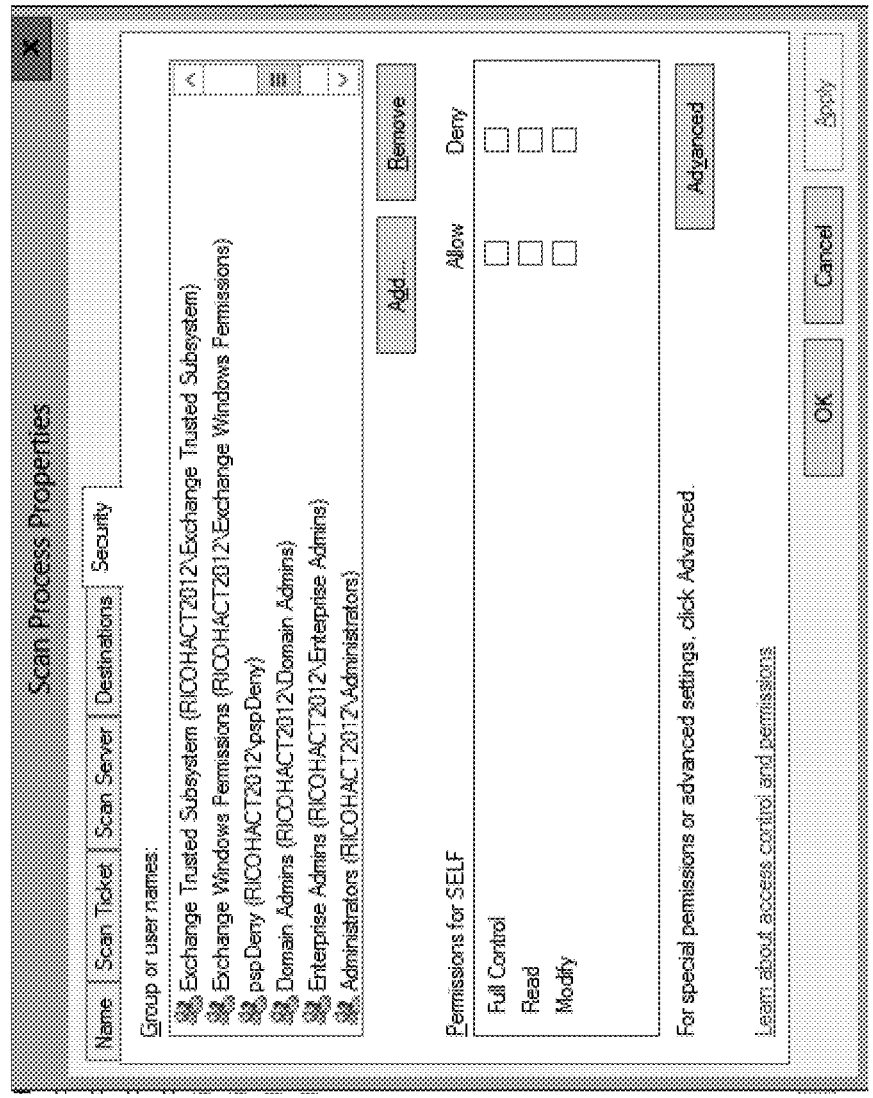
FIG. 6 is a diagram that depicts an example graphical user interface that allows an administrator to specify one or more users and/or one or more groups that are allowed to access the corresponding scan process definition, in an embodiment.

FIG. 6 is a diagram that depicts an example graphical user interface 600 that is provided by SMC 112 and that allows an administrator to specify one or more users and/or one or more groups that are allowed to access the corresponding scan process definition, in an embodiment. In this example, the "Security" tab is selected. The "Security" tab includes two frames: one frame for displaying a list of user/group names and another frame for specifying permissions for a particular user or group, such as "Full Control," "Read Only," and "Modify." If "Read Only" is selected for a particular user that is allowed to access a scan process definition, then, if that user causes scan device 130 to send a request to definition server 120 for the scan process definition, definition server 120 sends the scan process definition with the permission data to scan device 130. Based on the "Read Only" permission, scan device 130 prevents the user from modifying any of the options or parameters in the scan process definition. If "Full Control" is selected for a particular user that is allowed to access a scan process definition, then the particular user is allowed to perform all operations (e.g., read, write, delete) on the scan process definition, including changing access permission. If "Modify" is selected for a particular user that is allowed to access a scan process definition, then the particular user is also allowed to perform all operations (e.g., read, write, delete) on the scan process definition, but is not allowed to change to any access permissions. For a particular permission, if both "Allow" and "Deny" are left unchecked for a particular permission, then a default may be to "Deny" the "Full Control" and "Modify" permissions and to "Allow" the "Read" permission.

In a related embodiment, interface 600 allows an administrator to specify permissions for a scan process definition at a lower level of granularity. For example, a user may be given permission to modify scan setting data, but may be given only read access to the destination data and may be given no access to the user access right data of the scan process definition.

Interface 600 also includes an "Add" button that allows an administrator to add a new group name or user name to the list of user/group names and a "Remove" button that allows an administrator to remove or delete a user name or group name from the list of user/group names.

In an alternative embodiment, scan process definition 300 does not include user access right data 330. In this embodiment, definition server 120 (described in more detail below) uses one or more other criteria (described in more detail below) to determine whether a user at scan device 130 is authorized to access scan process definition 300.

4. Optional Data

Returning to FIG. 3, extension data 340 is optional data that may or may not be found in a scan process definition. As FIG. 3 depicts, extension data 340 may include many types of information, such as an invoice number, one or more details, a link, and a comment, each of which may be stored in association with scan data that is generated based on scan settings data 310. Additionally or alternatively, extension data 340 may include instructions for scan device 130, for scan server 140, and/or for another service outside of scan management system 100. Examples of extension data 340 are provided below.

5. Example Definition

In an embodiment, a scan process definition is defined in an XML format that is interpretable by scan device 130. Thus, a scan process definition file may comprise an XML document that includes one or more elements that correspond to the types of information described previously; namely, an element for scan settings data, an element for destination data, an element for user access right data, and an element for extension data.

FIG. 7 depicts an example scan process definition, in an embodiment. The scan process definition includes (1) scan settings data that is specified within the "ScanTicket" element and (2) destination data that is specified within the "FiltersToProcess" element.

C. Definition Server

Definition server 120 is a computing device that comprises one or more processors and one or more storage media for storing instructions which, when processed by the one or more processors, perform certain operations. As noted previously, the functionality of administrator terminal 110 and definition server 120 may be co-located on the same computing device.

Definition server 120 stores scan process definitions. Definition server 120 may store scan process definition data locally on definition server 120, or remotely, depending upon a particular implementation. Definition server 120 may also store scan process identification data that corresponds to and identifies one or more scan process definitions. Definition server 120 is configured to respond to requests, from SMC 112, for scan process definitions to edit at administrator terminal 110. For example, if an administrator at administrator terminal 110 desires to change a storage location for scan data that is generated based on a particular scan process definition, then the administrator causes SMC 112 to send a request for the particular scan process definition, which is then displayed via SMC 112. Through SMC 112, the administrator changes the destination data indicated in the particular scan process definition to indicate a new storage location, such as an email address or a network folder that was not indicated before in the particular scan process definition.

A non-limiting example implementation of definition server 120 is Microsoft's Active Directory Server.

Definition server 120 may be configured to support versioning of process definitions. For example, definition server 120 may be configured to maintain a current version of a scan process definition and one or more previous versions of the scan process definition and allow a SMC 112 to request a particular version of a scan process definition. For example, SMC 112 may send a request for a list of identifiers that identify all the scan process definitions stored by definition server 120. The list may include (1) a definition name for a first scan process definition and also include "v1" for that definition and (2) the same definition name for a second scan process definition and also include "v2" for that definition. As another example, SMC 112 may be configured to specify, in a request, a name or identifier (e.g., "Legal Dept") of one or more scan process definitions. If multiple scan process definitions are associated with the name or identifier, then definition server 120 sends a list that identifies or distinguishes each definition from the other definitions (e.g., via a "v1", "v2", etc. convention).

Definition server 120 is also configured to respond to requests, from a scan device (e.g., scan device 130), for scan process definitions. A request from a scan device includes data that definition server 120 uses to select one or more scan process definitions from among multiple scan process definitions. Such data may include identification data and/or authentication data, such as a username and password that a user provides in association with scan device 130. For example, a user enters his/her username and password using a keyboard provided by scan device 130. In response to receiving the authentication data, definition server 120 determines scan process definitions that are associated with the authentication data. For example, definition server 120 may determine one or more scan process definitions that are directly associated with the authentication data. In addition, definition server 120 may determine, based on the authentication data, whether the user is associated with any groups. If so, definition server 120 identifies one or more groups and then determines scan process definitions that are associated with each group of the one or more identified groups.

In response to identifying one or more scan process definitions based on a request from scan device 130, definition server 120 provides scan process definition identification data to scan device 130. The scan process definition identification data identifies one or more scan process definitions. The scan process definition identification data may include the actual one or more scan process definitions (scan ticket, destination, etc.) or may only identify the one or more scan process definitions. In case of the latter scenario, scan device 130 displays, on a display screen associated with scan device 130, data that identifies the one or more scan process definitions. The scan device 130 allows a user to select a scan process definition identifier from among one or more scan process definition identifiers. In response to receiving input that selects a particular scan process definition identifier, scan device 130 sends, to definition server 120, selection data that identifies the scan process definition that the user selected. In response, definition server 120 sends the selected scan process definition to scan device 130.

D. Scan Device

Scan device 130 is a computing device that is configured to process scan jobs, each of which involves generating scan data based on one or more scan settings (indicated in the scan settings data of a scan process definition retrieved from definition server 120). Scan device 130 may include one or more hardware, firmware and software elements that allow certain operations to be performed by scan device 130, such as receiving user input, communicating with definition server 120, performing a scan operation, communicating with scan server 140, and storing data in local storage.

Scan device 130 is not limited to devices that only perform scanning and scan device 130 may include other functionality. For example, scan device 130 may be a multi-function peripheral (MFP) device that includes other capabilities, such as printing, faxing, archiving, etc.

Scan data generated by scan device 130 may include of a set of one or more image files, each of which may be in any image format, such as PDF or TIFF.

Scan device 130 includes an interface that allows a user to initiate a scan job. The interface may comprise a display screen for displaying data and selectable buttons for initiating a scan job. Scan device 130 may include other buttons, some of which may be physical and others of which may be graphical.

Scan device 130 may be configured to require user authentication before a user is allowed to initiate a scan operation at scan device 130. For example, scan device 130 may have an attached badge reader that is capable of reading authentication data from a badge of a user. As another example, the scan device 130 may query a user to enter authentication data via a user interface of the scan device. The data may be one or more values that scan device 130 reads and sends to definition server 120 in order to authenticate the user.

After generating scan data based on a scan job, scan device 130 sends the scan data to scan server 140. Scan device 130 may send the scan data to scan server 140 based on destination data. The destination data may identify scan server 140 or may simply be an indication that the scan data is to be processed within system 100. The destination data may be indicated in the scan process definition that was used to create the scan data or may be specified by a user at scan device 130.

Alternatively, scan device 130 is configured to automatically send scan data (e.g., a set of one or more scan images) to scan server 140 once the scan data is generated.

In addition to scan data, scan device 130 may also send other data to scan server 140. Such data may include scan process definition identification data and/or destination data, describe in more detail below.

In an embodiment, scan device 130 uses a standard protocol to communicate with scan server 140. An example of the standard protocol is the Distributed Scan Processing Web Service protocol. This protocol uses the XML schema described in the Distributed Scan Processing Web Service Schema.

E. Scan Server

Scan server 140 is a computing device that comprises one or more processors and storage media that stores instructions which, when processed by the one or more processors, cause certain operations to be performed. Alternatively, scan server 140 is a computing device that comprises special-purpose hardware logic for performing the operations.

Scan server 140 receives scan data from scan device 130 (and, optionally, one or more other scan devices, not depicted) and causes the scan data to be stored based on one or more criteria. The one or more criteria may indicate where to store the scan data. For example, if destination data accompanies scan data from scan device 130, then scan server 140 may send the scan data to one or more destinations indicated in the destination data. Example destinations include a network folder (that is located in a network that is "local" to scan server 140), a third party storage service (that is located in a remote network), or a set of one or more email addresses. The destination data may indicate any combination of these example destinations. Furthermore, the destination data may be supplied by a user at scan device 130, included in a scan process definition retrieved from definition server 120, or both. For example, (1) a user may enter a personal email address to which scan server 140 is to send scan data and (2) a scan process definition that the user selects may include a name of a network folder to which scan server 140 is to store the scan data.

Alternatively, scan server 140 may be configured to store scan data from scan jobs in the same location. Such an embodiment may be used for all scan jobs or only for scan jobs where no destination data accompanies the resulting scan data.

In an embodiment, prior to causing scan data to be stored at one or more destinations, scan server 140 validates the scan process definition (referred to herein as the "received definition") that includes the scan settings that were used to create the scan data. Validation may involve scan server 140 sending the received definition (i.e., received from scan device 130) to definition server 120. Definition server 120 determines whether the received definition matches a scan process definition (referred to herein as the "original definition") that definition server 120 provided to scan device 130. A "match" may be an exact match between the two scan process definitions. Alternatively, a "match" may be an exact match of one or more portion of the original definition that have been designated as unalterable with the corresponding one or more portions of the received definition. Validation of a scan process definition may be performed on an entire scan process definition, a portion of a scan process definition, or data that represents a scan process definition. For example, scan server 140 may send to definition server 120 hash data that represents a scan process definition. The definition server 120 compares the hash data received from scan server 140 to other hash data for the scan process definition.

If definition server 120 provides a response that indicates that the received definition matches the original definition, then scan server 140 continues processing the scan data. Else, scan server 140 may send a notification to scan device 130 that the received definition identified is not valid. Also, scan server 140 might not cause the scan data to be stored at the appropriate or designated destination(s).

In an embodiment, scan server 140 maintains an event log that logs information regarding different scan jobs. The event log may store, for each scan job, data that indicates one or more of what scan device was involved, when the scan job was performed, which scan process definition was used, where the corresponding scan data is stored, who initiated the scan job, the type of error that occurred (if the scan job failed), scan data information (e.g., number of pages, total size in MB, paper size, etc.), and/or whether or which scan settings were modified by a user. The event log may be stored on the same device that executes the scan server or on a separate device. An event manager that is separate from the scan server may be configured to manage event subscriptions, analyze the event log to determine whether any events of interest have occurred, and, in response to determining that events of interest have occurred, transmit event notifications to one or more event sinks associated with the relevant event subscriptions.

F. Example Process

Figure 8:
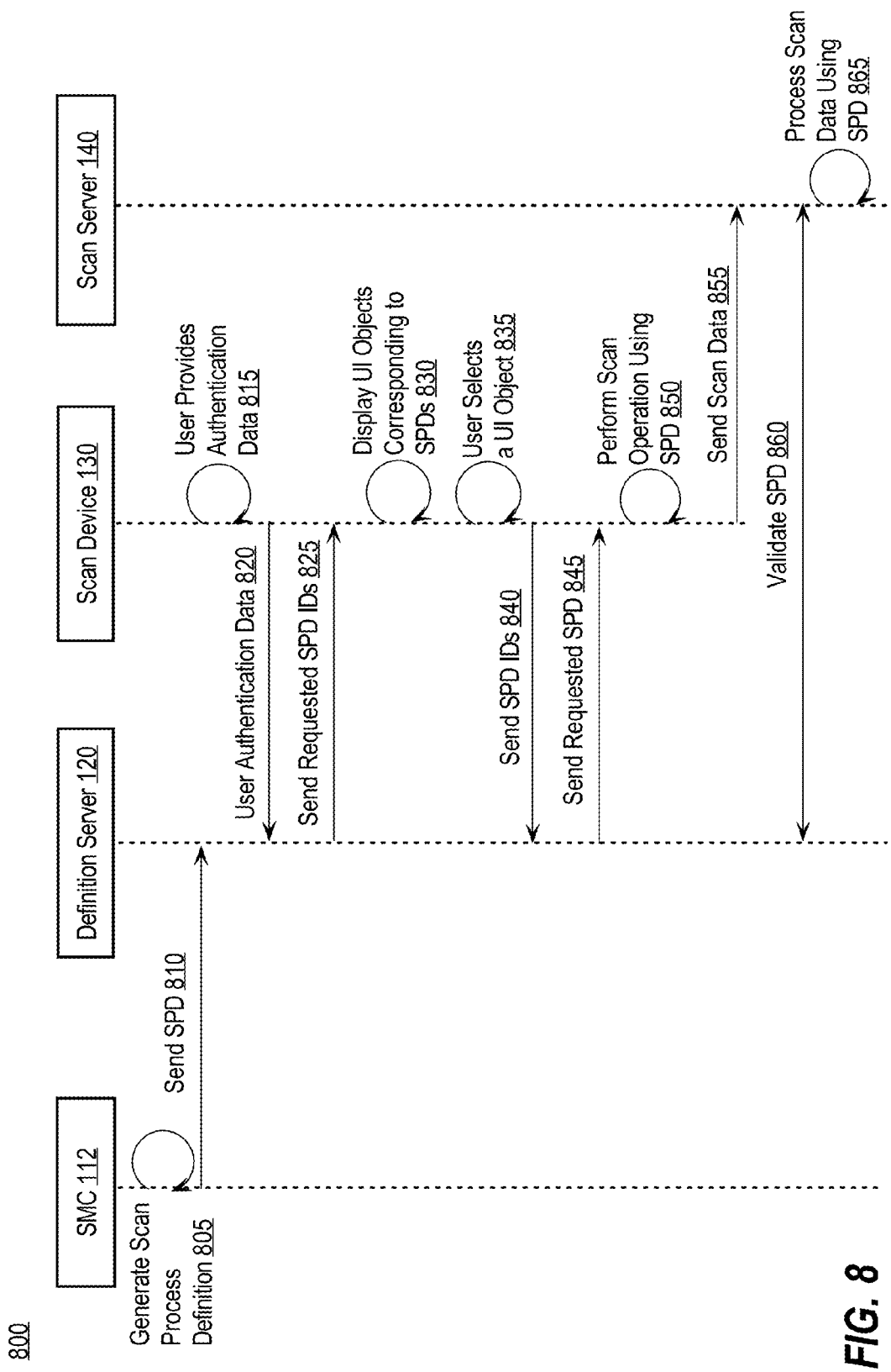
FIG. 8 is a flow diagram that depicts a process for processing a scan job in a distributed scan management system, in an embodiment.

FIG. 8 is a sequence diagram that depicts a process 800 for processing a scan job in a distributed scan management (DSM) system, in an embodiment. At step 805, an administrator uses SMC 112 to generate a scan process definition that includes scan settings data, destination data, user/group access rights, and post-scan instructions that will be processed by scan server 140. The destination data may identify scan server 140.

At step 810, the scan process definition is transmitted to and stored by definition server 120.

At step 815, a user at scan device 130 provides authentication data to scan device 130.

At step 820, scan device 130 sends the user's authentication data to definition server 120. Definition server 120 determines one or more scan process definitions that are associated with the user's authentication data.

At step 825, definition server 120 sends scan process identification data to scan device 130. The scan process definition data identifies the one or more scan process definitions that were determined by definition server 120 based on the user' authentication data. The scan process identification data may include, for example, labels that were specified by an administrator that created the scan process definitions or may be computer-generated labels that were generated based on information provided by the administrator.

At step 830, scan device 130 causes one or more user interface objects to be displayed on a display screen of scan device 130. Each user interface object corresponds to a scan process definition that is identified in the scan process definition data. A user interface object may be implemented as, for example, a graphical button or a menu option in a list of menu options.

At step 835, a user selects particular scan process definition identification data that corresponds to a scan process definition. In the situation where the scan process identification data includes scan process definition identifiers, each scan process definition identifier may be associated with (a) a graphical button that is displayed on a display screen of scan device 130 or (b) a physical button that is adjacent to the display screen. Selection of a scan process definition identifier may, thus, involve selecting a button that is associated with the identifier.

At step 840, scan device 130 sends the selected scan process definition identifier to definition server 120. The actual data that is sent to definition server 120 may be different than the identifier that is displayed. For example, while a scan process definition identifier may be a human-readable label (e.g., "CEO Def") when the identifier is displayed, the actual data that is sent to definition server 120 may be something entirely different, such as a code that corresponds to the scan process definition, e.g., "spd023988561."

At step 845, definition server 120 sends the scan process definition that is identified by the selected scan process identifier to scan device 130. In an embodiment, an authenticated user is allowed to modify one or more portions of a scan process definition. For example, an authenticated user may change (a) one or more of the scan settings in the scan settings data of a scan process definition, (b) one or more of the post-scan instructions of the scan process definition, or (c) a scan server to which scan data is to be sent. A scan process definition may include modification data that indicates that the scan process definition (or only certain portion thereof) may be modified by a user.

At step 850, scan device 130 performs a scan operation using one or more of the scan settings indicated in the scan process definition and generates scan data. For example, the scan data may represent one or more printed documents scanned by the scan device 130.

At step 855, scan device 130 sends the scan data (e.g., one or more scan images) to scan server 140 based on the destination data in the scan process definition. Scan device 130 may also send, to scan server 140, any post-scan instructions indicated in the scan process definition. For example, scan device 130 may send destination data that identifies one or more destinations to which scan server 140 is to send the scan data. As another example, scan device 130 may send operation data that identifies one or more operations to be perform on the scan data before causing the scan data (or data generated therefrom) to be stored. Such operations may include optical character recognition (OCR) to generate text data (e.g., a Word document), which is subsequently stored, and encryption to encrypt the scan data (or data generated therefrom).

In an alternative embodiment, instead of sending the scan data to scan server 140, scan device 130 sends the scan data to an external application (not depicted in FIG. 1) that is outside of scan management system 100. In this embodiment, scan device 130 may also provide additional information, such as instructions on how to process the scan data or extract data from the scan data. For example, scan device 130 may instruct the external application to perform a OCR operation on the scan data in order to generate and stored editable text data. As another example, scan device may instruct the external application to encrypt the scan data (or data generated therefrom) before storing the encrypted scan data.

At step 860, scan server 140 communicates with definition server 120 to validate the scan process definition that was used by scan device 130 in performing the scan operation.

At step 865, scan server 140 processes the scan data based on the post-scan instructions that are indicated in the scan process definition. The post-scan instructions may include destination data that indicates one or more destinations to which the scan data is to be sent or stored. Thus, step 865 may involve causing the scan data to be stored in one or more storage locations, such as in a particular network folder, or by sending an email with the scan data attached thereto. Alternatively, scan server 140 may be configured to always cause scan data to be sent or stored in the same location, such as always sending scan data to a particular email address or storing all scan data in a particular network folder. Additionally or alternatively, scan server 140 may be configured to analyze the scan data or metadata (generated by scan device 130) of the scan data to determine which storage location the scan data is to be stored. For example, metadata of the scan data may identify a name (or identifier) of a user (e.g., that initiated the scan operation) and the name is mapped to a particular storage location, such as an email address.

III. Metadata Support

In an embodiment, scan server 140 processes metadata that is sent in association with scan data that is generated by and transmitted from scan device 130. The metadata is distinct and separate from the post-scan instructions of a scan process definition. The metadata may originate from one or more sources, such as metadata that is specified in a scan process definition, metadata that is specified by a user at scan device 130, and metadata that is retrieved by scan device 130 from a source that is external to scan device 130. Each of these sources is described in more detail below.

A. Extension Data

In an embodiment, administrator terminal 110 provides a user interface that allows an administrator to specify extension data (e.g., extension data 340) to be included in a scan process definition. Such an interface is referred to herein as an "extension data UI." The extension data is used by scan device 130 to associate metadata with scan data that is generated in response to processing a scan job.

In an embodiment, the extension data is included in an individual hardware vendor (IHV) extension point within a scan process definition that is in an XML format. An example opening tag for an IHV extension point is "<ihv>."

FIG. 9 depicts an example scan process definition that includes extension data, in an embodiment. In this example, the extension data is within three IHV elements. One of the IHV elements includes a URL from which scan device 130 is to retrieve information. The URL identifies a web page of an expense system that is used for submitting a receipt. The second IHV element is an expense report identifier that is associated with scan data that is to be generated based on the scan settings data in the example scan process definition. The third IHV element is a comment field, which may, after being processed by scan device 130, cause a GUI to be displayed at scan device 130, where the GUI prompts the user for input, which will accompany to-be-generated scan data as "comments."

In an embodiment, the extension data UI is separate from the user interface described above that allows a user to create/edit scan process definitions (referred to herein as a "definition UI"). Alternatively, the definition UI includes extension data UI capabilities. In other words, there is only one UI at administrator terminal 110 and that UI allows an administrator to create/edit scan process definitions and specify extension data for one or more scan process definitions.

An extension data UI may simply comprise a text entry field that allows the administrator to specify the extension data. In this way, the extension data UI functions as a simple text editor. Thus, if a scan process definition is XML data, then the administrator may be required to specify all the extension data, including all the necessary XML formatting. If the administrator does not format the extension data properly within a scan process definition, then scan device 130 might not be able to properly interpret the extension data.

Alternatively, an extension data UI includes one or more text entry fields, each of which is associated with an XML element that may be inserted in a scan process definition. When an administrator desires to save the specified extension data, the user interface is configured to create the appropriate element tags (and, optionally, tag attribute data) that are interpretable and recognizable by scan device 130.

B. Processing Extension Data

In response to receiving a scan process definition, scan device 130 analyzes the scan process definition for extension data. For example, scan device 130 determines whether the scan process definition includes IHV extension point data, such as an IHV tag within the scan process definition. If no extension data is discovered within the scan process definition, then scan device 130 proceeds as normal; that is, scanning one or more printed documents based on scan settings data in the scan process definition. The determination of whether a scan process definition includes extension data may be made before or after scan device 130 generates scan data for a scan job.

In an embodiment, scan device 130 includes an XML Schema Definition (XSD) that scan device 130 uses to determine whether the extension data conforms to the XSD. If not, then it may be presumed that the extension data (or the corresponding scan process definition) was modified (or otherwise tampered with) before arriving at scan device 130.

1. External Data

In an embodiment, extension data is used by scan device 130 to retrieve data from an external source. For example, an IHV element in a scan process definition may include an element (e.g., "<external source>") or attribute that indicates that an external source is involved. Scan device 130 is configured to distinguish such an element (or attribute) from other possible elements or attributes in the scan process definition. Data within a scan process definition that indicates that an external source is involved is referred to herein as "external source data."

If extension data includes external source data, such data may include an address (e.g., IP address) of an external source or data that is associated with such an address and that is stored on scan device 130. For example, scan device 130 stores an association between external source A and an IP address of external source A. Then, in response to determining that external source data indicates "external source A," scan device 130 uses the IP address to send a request to external source A.

If extension data includes external source data, such data may also include data that indicates what to request from the external source. For example, a request may be for a next invoice number (or an invoice number that has not yet been created). In response to receiving such a request for a next invoice number from scan device 130, the external source determines an invoice number that will be associated with the corresponding scan job (or the generated scan data).

After receiving data from an external source, scan device 130 associates the data with scan data. The data received from an external source is referred to herein as "external data." Scan device 130 sends the external data and the scan data to scan server 140. Scan device 130 may send the external data immediately before or immediately after the scan data. Alternatively, scan device 130 sends the external data within the same message that includes the scan data.

i) Example Scenario

The following is an example of how external source data within a scan process definition may be used. In this example, the external source data includes an instruction to send a request for invoice information to an invoice server. The external source data may indicate one or more parameters (e.g., user credentials, date range, etc.) that should be included in the request. Accordingly, scan device 130 sends the request (and any parameters thereof) to the invoice server indicated in the external source data.

The invoice server responds to the request by retrieving invoice information from an invoice database, which may be local or remote relative to the invoice server. The invoice server sends the invoice information to scan device 130, which causes at least a portion of the invoice information to be displayed. For example, scan device 130 displays multiple invoice numbers, each of which is selectable by a user at scan device 130. The user selects one of the invoice numbers.

After scan device 130 performs a scan operation based on the scan settings data in the scan process definition, scan device 130 sends the selected invoice number, the scan data, and post-scan instructions to scan server 140. The invoice number may be embedded as metadata of the scan data or may simply accompany the scan data as the scan data is sent to scan server 140.

Scan server 140 processes the scan data in accordance with the post-scan instructions, which processing includes causing the scan data to be stored in one or more storage locations. Scan server 140 may also validate the scan process definition with definition server 120.

A third-party service, such as the invoice server, may be notified when a scan data is stored at a certain storage location in a number of ways. For example, the invoice server may periodically poll the storage location (e.g., every 2 minutes). As another example, a network folder may be associated with a listener process that detects when scan data is stored in the network folder. The listener process then notifies the invoice server of that event. In response to being notified, the invoice server retrieves the scan data and the associated metadata (which includes the selected invoice number) and stores the scan data in an invoice database in association with the metadata. As another example, scan server 140 stores event information in an event log of an event system whenever scan server successfully processes a scan data according to post-scan instructions. The event system may be configured to send notifications to other processes or services (such as the invoice server) when certain events are stored in the event log. As another example, scan server 140 may be configured to notify scan device 130 (e.g., through an event notification) that the scan data was successfully stored. In response to receiving this notification, scan device 130 may be configured to notify another service (not depicted in FIG. 1) that scan data is ready to be processed. This latter notification may simply inform the other service about the scan data or may provide additional instructions on how to process the scan data, such as extracting certain data from scan data, associating other data with the extracted data, and storing the extracted data and other data in a certain storage location.

This example scenario may vary greatly from one implementation to another. In one possible implementation, scan device 130 stores the selected invoice number in association with a job ID. Scan device 130 subsequently sends the selected invoice number and job ID to scan server 140 along with the post-scan instructions. Scan server 140 then sends a notification to definition server 120 along with the job ID. Definition server 120 receives the job ID and then requests, from scan server 140, the invoice information associated with the job ID. In response to receiving the invoice information from scan server 140, definition server 120 sends the invoice information to an invoice server. In response, the invoice server retrieves the scan data from a storage location that was indicated in the post-scan instructions. The invoice server may be configured to retrieve information from the storage location or may be configured to use storage location data associated with the job ID to first identify the storage location and then retrieve the information from the storage location.

2. User Input

In an embodiment, extension data is used by scan device 130 to receive user input that is to be associated with scan data of a scan job. For example, an IHV element in a scan process definition may include an element (e.g., "<user input>") that indicates that user input is involved. Data within a scan process definition that indicates that user input is involved is referred to herein as "user input data."

If extension data includes user input data, then scan device 130 generates a user interface that allows a user at scan device 130 to enter data, such as voice data or text data using a keyboard provided by scan device 130. The user interface may be generated based on data within the user input data, referred to herein as "input interface data." In other words, scan device 130 is configured to read the input interface data and generate a user interface that is based on the input interface data. In this way, the user input data may also define how data reflected in user input is to be formatted and/or processed by scan server 140.

Alternatively, the user interface generated by scan device 130 is not generated based on the user input data. Instead, scan device 130 may be configured to generate the user interface in response to detecting the user input data.

After user input is received through the user interface (regardless of how the user interface is generated), scan device 130 sends the user input along with scan data (that scan device 130 generates based on the scan settings indicated in the scan process definition) to scan server 140.

3. Pass Through Data

In an embodiment, scan device 130 associates at least a portion of the extension data with scan data of a scan job. For example, an IHV element in a scan process definition may include an element (e.g., "<pass through>") or attribute that indicates that data within the element (or associated with the attribute) is to be associated with scan data that will be generated. Such data is referred to herein as "pass through data." Scan device 130 identifies the pass through data and, after generating scan data based on one or more scan settings indicated in the scan processing definition that includes the extension data, sends the pass through data and the scan data to scan server 140. Scan device 130 may also send destination data or post-scan instructions that indicate where scan server 140 is to store the scan data and the pass through data. One example use of pass through data is to use the pass through data to perform image processing and/or file format conversion at scan server 140 (or other destination to which the generated scan data will be stored).

IV. Rights Management Service

According to an embodiment, distributed scan management system 100 is associated with a rights management service (RMS). The RMS is used to restrict who can access certain scan data, when the access is allowed, and/or what type of access is allowed. For example, groups A and B may be the only groups allowed to access particular scan data. Users from group A may be allowed to access the particular scan data any time of the day while users from group B may be allowed to access the particular scan data only during working hours. Also, users from group A may be allowed to only perform certain operations with respect to the particular scan data, such as read, print, copy, forward the particular scan data and modify metadata of the particular scan data. Users from group B, on the other hand may be allowed to only read and print the particular scan data. Access rights data that indicates who, when, and/or how scan data may be accessed is referred to herein as "rights management data."

A. Source of Rights Management Data

Rights management data may be defined in one or more locations. For example, rights management data may be defined by an administrator at administrator terminal 110. Administrator terminal 110 provides a user interface that is configured to allow an administrator to define rights management data within a scan process definition, for example, within an extension portion (e.g., an IHV extension point) of a scan process definition.

FIG. 10 depicts an example scan process definition that includes rights management data, in an embodiment. In this example, the rights management data is located within an IHV element and indicates "everyone-read-only."

As another example, rights management data may be defined by a user at scan device 130. Thus, scan device 130 provides a user interface that allows a user at scan device 130 to define rights management data. The user interface may be generated based on extension data within a scan process definition. Alternatively, scan device 130 may be configured to provide a user interface to allow a user to define rights management data without relying on any portion of a scan process definition. In either scenario, if a selected scan process definition does not include rights management data, then a user at scan device 130 may define rights management data "from scratch" for scan data that is generated based on the selected scan process definition.

In a related embodiment, one portion of rights management data for a particular set of scan data may be defined within a scan process definition that was used to generate the particular set of scan data, while another portion of rights management data may be defined by a user at scan device 130 that generated the particular set of scan data.

In an embodiment, extension data within a scan process definition that includes rights management data may indicate whether or which portions of the rights management data may be modified at a scan device, such as scan device 130. For example, the extension data may indicate that a user at a scan device is not allowed to modify any of the scan data access rights. As another example, the extension data may indicate that a user at a scan device may only add additional restrictions and not remove any of the restrictions indicated in the rights management data. As another example, the extension data may indicate that a user at a scan device is allowed to modify only who can access the scan data but is not allowed to modify what type of access (e.g., read, print, copy, delete) is allowed.

B. Pre-Scan Server Approach

Figure 11:
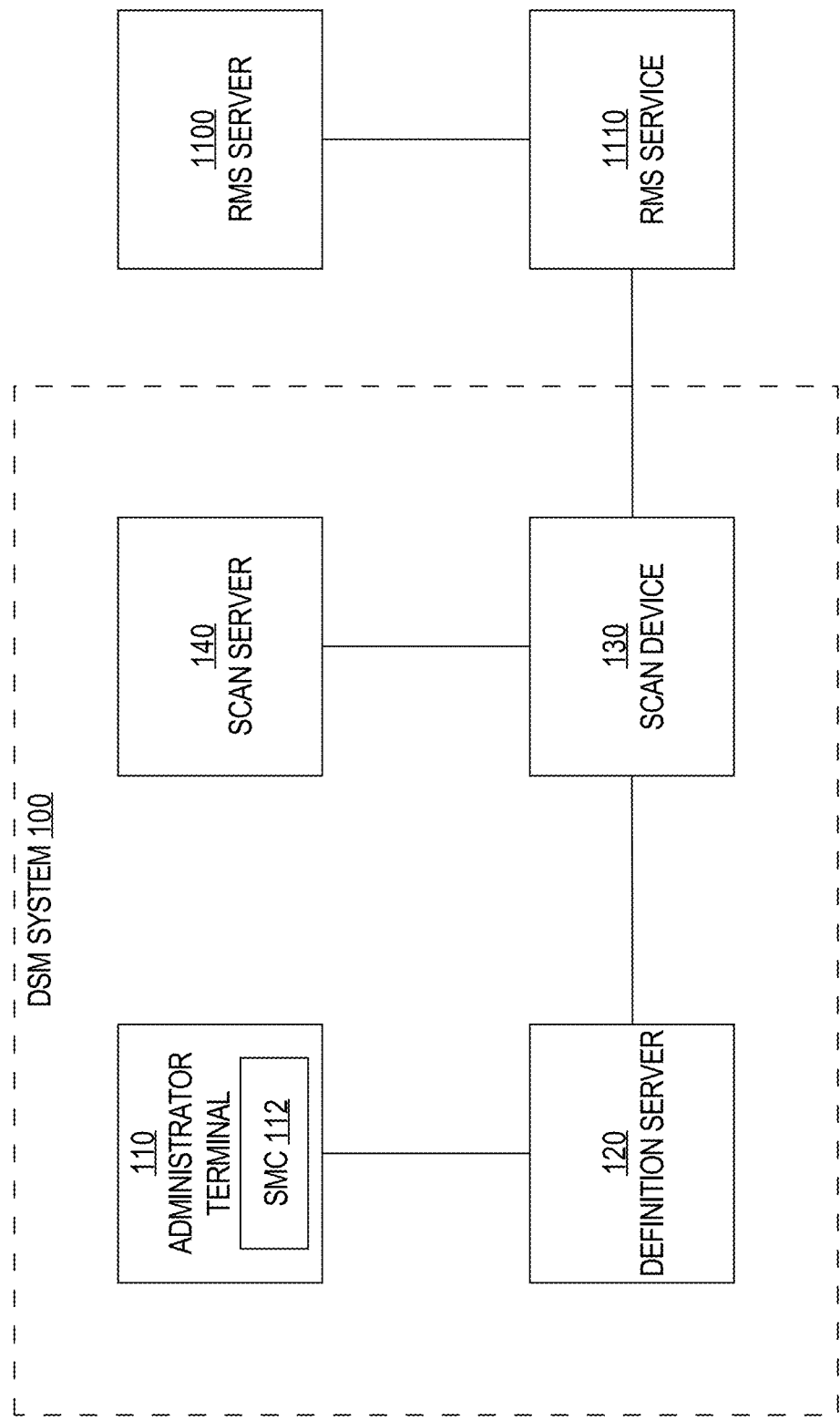
FIG. 11 is a block diagram that depicts a distributed scan management system that is associated with a rights management service, in an embodiment.

FIG. 11 is a block diagram that depicts DSM system 100 that is associated with a rights management service (RMS) server 1100, in an embodiment. RMS server 1100 works with RMS-enabled applications (such as web browsers, email applications, word processing applications, and image viewer applications) to help safeguard digital information from unauthorized use. RMS server 1100 uses security technologies (such as encryption, certificates, and authentication) to help organizations create reliable information protection solutions.

In the depicted embodiment, scan device 130 is configured to communicate with a RMS service 1110, which is communicatively coupled to RMS server 1100. RMS service 1110 and RMS server 1100 may be provided by different parties or by the same party.

In an alternative embodiment, scan device 130 is not communicatively coupled to RMS service 1110. Instead, scan device 130 implements RMS service 1110 and is, thus, configured to communicate directly (albeit, over a network in an embodiment) with RMS server 1100.

Figure 12:
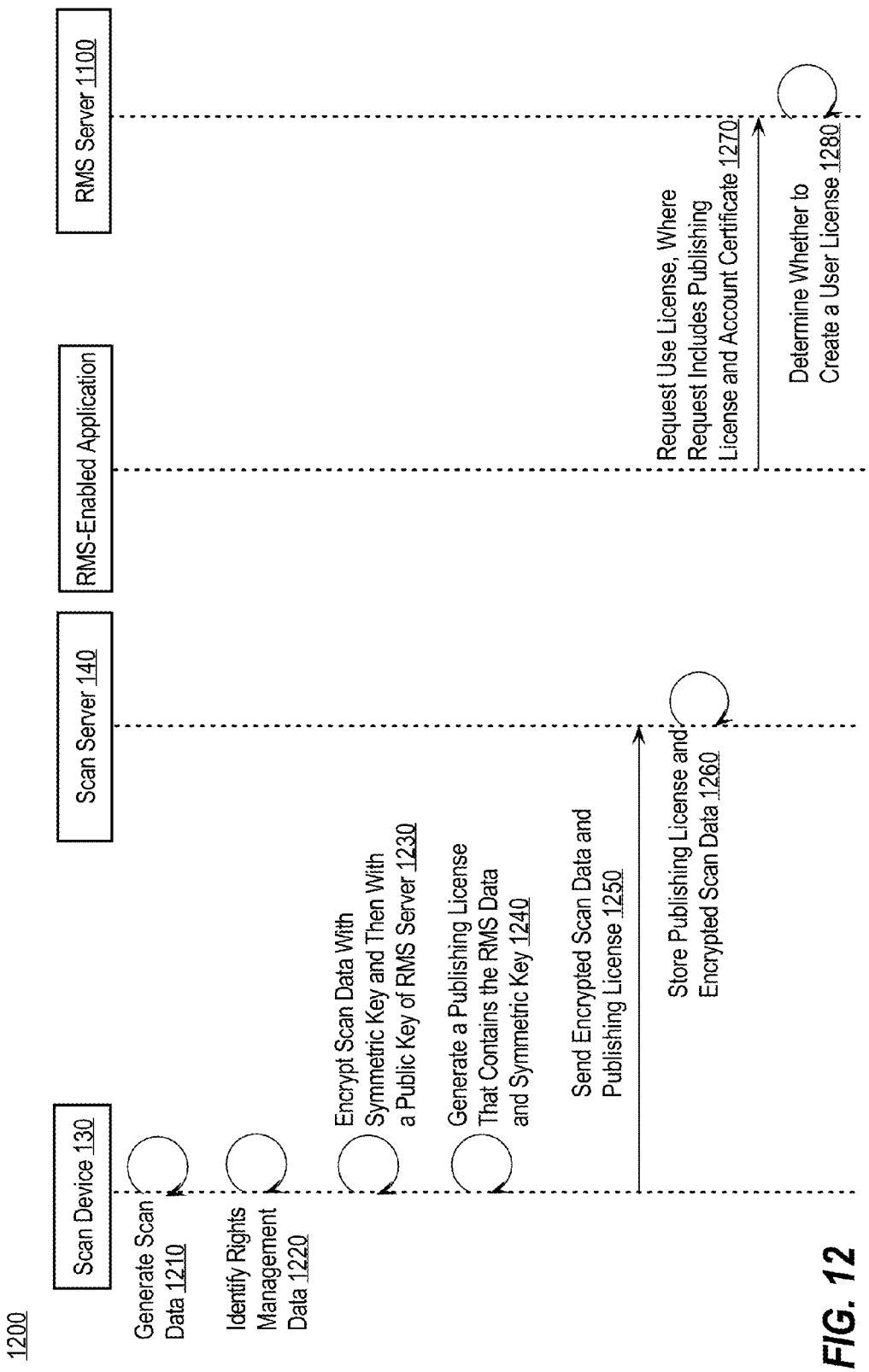
FIG. 12 is a sequence diagram that depicts a process for utilizing rights management data at a scan device, in an embodiment.

FIG. 12 is a sequence diagram that depicts a process 1200 for utilizing rights management data at scan device 130, in an embodiment.

At step 1210, scan device 130 generates scan data based on scan settings data specified in a scan process definition.

At step 1220, scan device 130 identifies rights management data. The rights management data may be specified at scan device 130 by a user of scan device 130. Alternatively, scan device 130 identifies the rights management data in the scan process definition. For example, scan device 130 analyzes an extension portion (e.g., an IHV extension point) of the scan process definition and detects the rights management data in that portion.

At some point prior to step 1220, scan device 130 may have received a client licensor certificate (CLC) generated by RMS server 1100.

At step 1230, scan device 130 encrypts the scan data with a symmetric key, which is then encrypted using a public key of RMS server 1100.

At step 1240, scan device 130 generates a publishing license that contains the rights management data and the symmetric key. The publishing license is then bound to the file. Only RMS server 1100 can issue use licenses to decrypt the encrypted scan data.

At step 1250, scan device 130 sends the encrypted scan data and publishing license to scan server 140. Prior to sending the encrypted scan data, scan device 130 may embed the publishing license within metadata of a file that contains the encrypted scan data.

At step 1260, scan server 140 causes the encrypted scan data and publishing license to be stored. As described previously, scan server 140 may be pre-configured to store scan data in a certain location. Alternatively, scan device 130 may have sent destination data to scan server 140 along with the encrypted scan data and publishing license. Scan server 140 then uses the destination data to determine where the encrypted scan data and publishing license are to be stored, such as in a certain network folder accessible to scan server 140.

At step 1270, a recipient uses an RMS-enabled application (not depicted in FIG. 11), such as a media presentation application, to send, to RMS server 1100, a request for a use license. The request includes the recipient's account certificate (that contains a public key of the recipient) and the publishing license.

At step 1280, RMS server 1100 validates whether the recipient is authorized, checks whether the recipient is a named user, and creates a use license. During this process, RMS server 1100 decrypts the symmetric key using a private key of RMS server 1100, re-encrypts the symmetric key using the public key of the recipient, and adds the encrypted session key to the use license. This step ensures that only the intended recipient can decrypt the symmetric key and, thus, decrypt the protected file. RMS server 1100 may also add any relevant conditions to the use license, such as an expiration of the user license or an application or operating system exclusion. Such conditions may have been specified in the rights management data.

C. Post-Scan Server Approach

Figure 13:
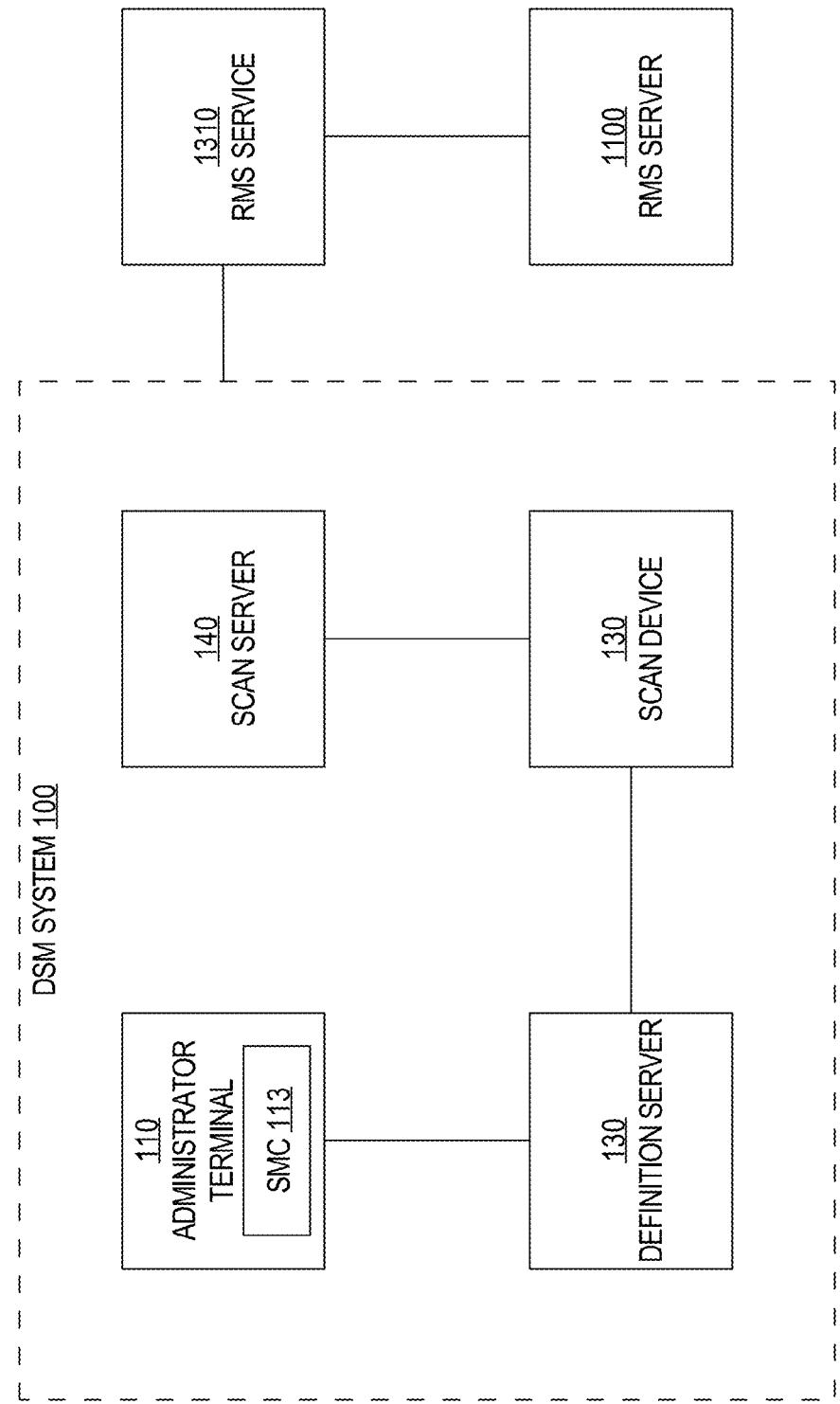
FIG. 13 is a block diagram that depict a distributed scan management system that is associated with a rights management service, in an embodiment.

FIG. 13 is a block diagram that depicts a distributed scan management system 1300 that is associated with RMS server 1100, in an embodiment. In this embodiment, RMS service 1310 is similar to RMS service 1110, except that RMS service 1310 operates on scan data after scan server 140 processes the scan data. Although FIG. 13 depicts RMS service 1310 as being communicatively coupled to DSM system 100, RMS service 1310 is communicatively coupled to one or more storage locations to which scan server 140 may store scan data. One of the storage locations may be within DSM system 100, such as a network folder that is local to DSM system 100. However, one of the storage locations may be outside DSM system 100, such as an email account or a storage service that is remote relative to DSM system 100.

In an alternative embodiment, RMS service 1310 is implemented on scan server 140 or one of the one or more storage locations to which scan server may store scan data.

Figure 14:
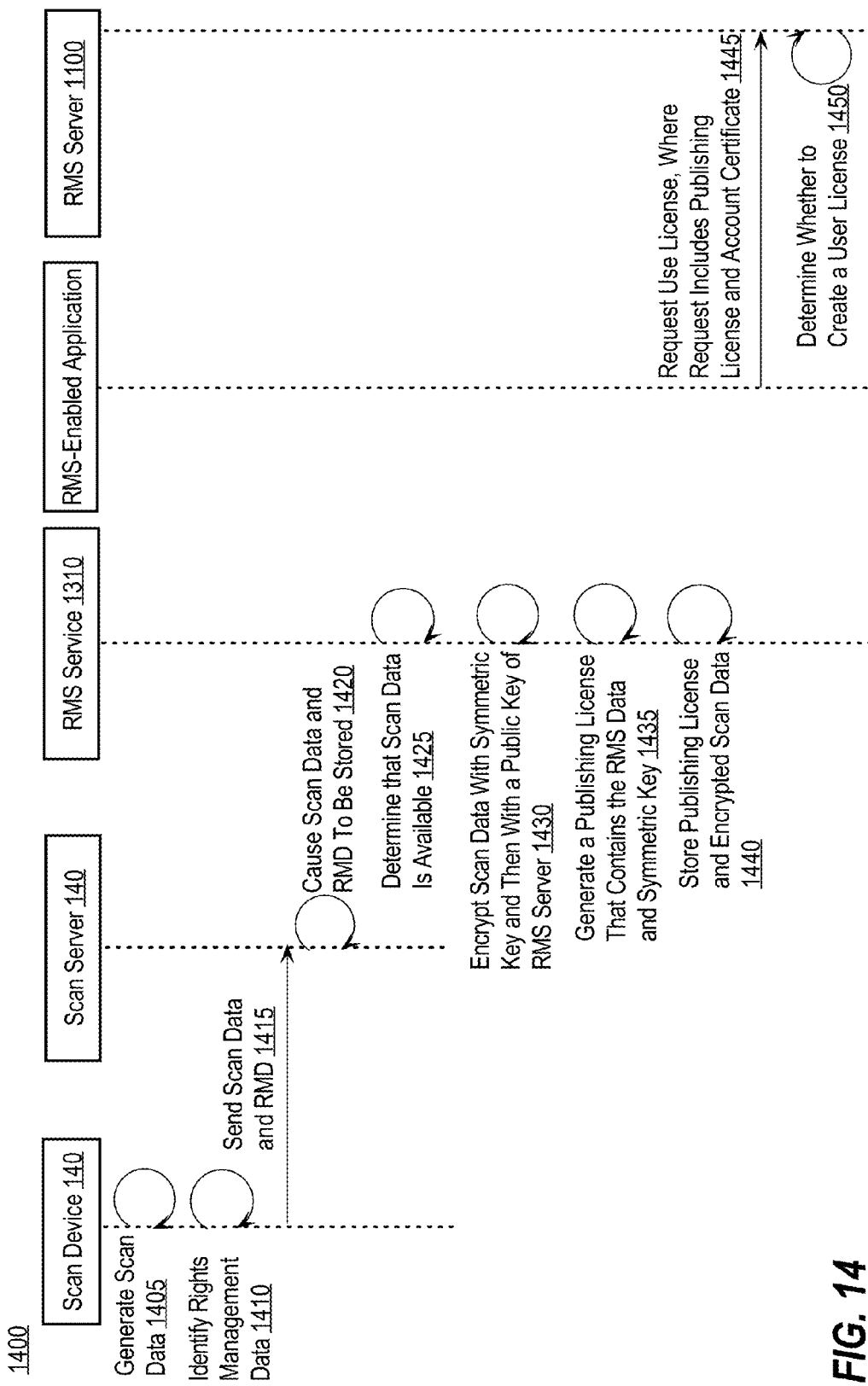
FIG. 14 is a sequence diagram that depicts a process for utilizing rights management data at a scan device, in an embodiment.

FIG. 14 is a sequence diagram that depicts a process 1400 for utilizing rights management data at scan device 130, in an embodiment. At step 1405, scan device 130 generates scan data based on scan settings data specified in a scan process definition.

At step 1410, scan device 130 identifies rights management data. The rights management data may be specified at scan device 130 by a user of scan device 130. Alternatively, scan device 130 identifies the rights management data in the scan process definition. For example, scan device 130 analyzes an extension portion (e.g., an IHV extension point) of the scan process definition and detects the rights management data in that portion.

At step 1415, scan device 130 sends the rights management data and the scan data to scan server 140, instead of sending the rights management data to RMS service 1310.

At step 1420, scan server 140 causes the rights management data to be stored in association with the scan data. The rights management data may be stored as metadata of the scan data. As noted previously, scan server 140 may use destination data that was included in a scan process definition to determine where to send the scan data and rights management data for storage, such as an email address, a network folder, or a storage service outside of the distributed scan management system 100.

At step 1425, after scan server 140 causes the scan data and rights management data to be stored at a particular location, RMS service 1310 determines that scan data is available at the particular location. RMS service 1310 may make this determination in one of several ways. For example, RMS service 1310 may periodically poll a network folder, an email account, or a shared storage account to determine whether scan data and rights management data has been stored therein since a previous polling action. As another example, a listener process at the particular location detects the storage of the scan data and sends a message to RMS service 1310.

At step 1430, in response to determining that scan data is available at the particular location, RMS service 1310 encrypts the scan data with a symmetric key, which is then encrypted using a public key of RMS server 1100.

At step 1435, RMS service 1310 generates a publishing license that contains the rights management data and the symmetric key. The publishing license is then bound to the file. Only RMS server 1100 can issue use licenses to decrypt the encrypted scan data.

At step 1440, RMS service 1310 causes the encrypted scan data and publishing license to be stored. Prior to causing the encrypted scan data to be stored, RMS service 1310 may embed the publishing license within metadata of a file that contains the encrypted scan data. The encrypted scan data and the publishing license may be stored in the same location from which RMS service 1310 read the original scan data and rights management data. For example, if the scan data and rights management data were stored in a particular network folder, then RMS service 1310 causes the encrypted scan data and publishing license to be stored in the particular network folder. Alternatively, RMS service 1310 may be configured to cause the encrypted scan data and publishing license to be stored in a different location. The different location may be "hard-coded" in RMS service 1310 or may be based on destination data that RMS service 1310 processes. Such destination data may have been stored along with the original scan data and rights management data or may originate from a different source.

At step 1445, a recipient uses an RMS-enabled application (not depicted in FIG. 13) to send, to RMS server 1100, a request for a use license. The request includes the recipient's account certificate (that contains a public key of the recipient) and the publishing license.

At step 1450, RMS server 1100 validates whether the recipient is authorized, checks whether the recipient is a named user, and creates a use license. During this process, RMS server 1100 decrypts the symmetric key using a private key of RMS server 1100, re-encrypts the symmetric key using the public key of the recipient, and adds the encrypted session key to the use license. This step ensures that only the intended recipient can decrypt the symmetric key and, thus, decrypt the protected file. RMS server 1100 may also add any relevant conditions to the use license, such as an expiration of the use license or an application or operating system exclusion. Such conditions may have been specified in the rights management data

V. Extend Scan Management System for Printing

According to an embodiment, a distributed scan management system (such as DSM system 100) is extended to support printing. Many of the components of a distributed scan management system, such as an administrator terminal, an active directory server, and a scan service may be leveraged in a print context where the scan device is a print device.

Figure 15:
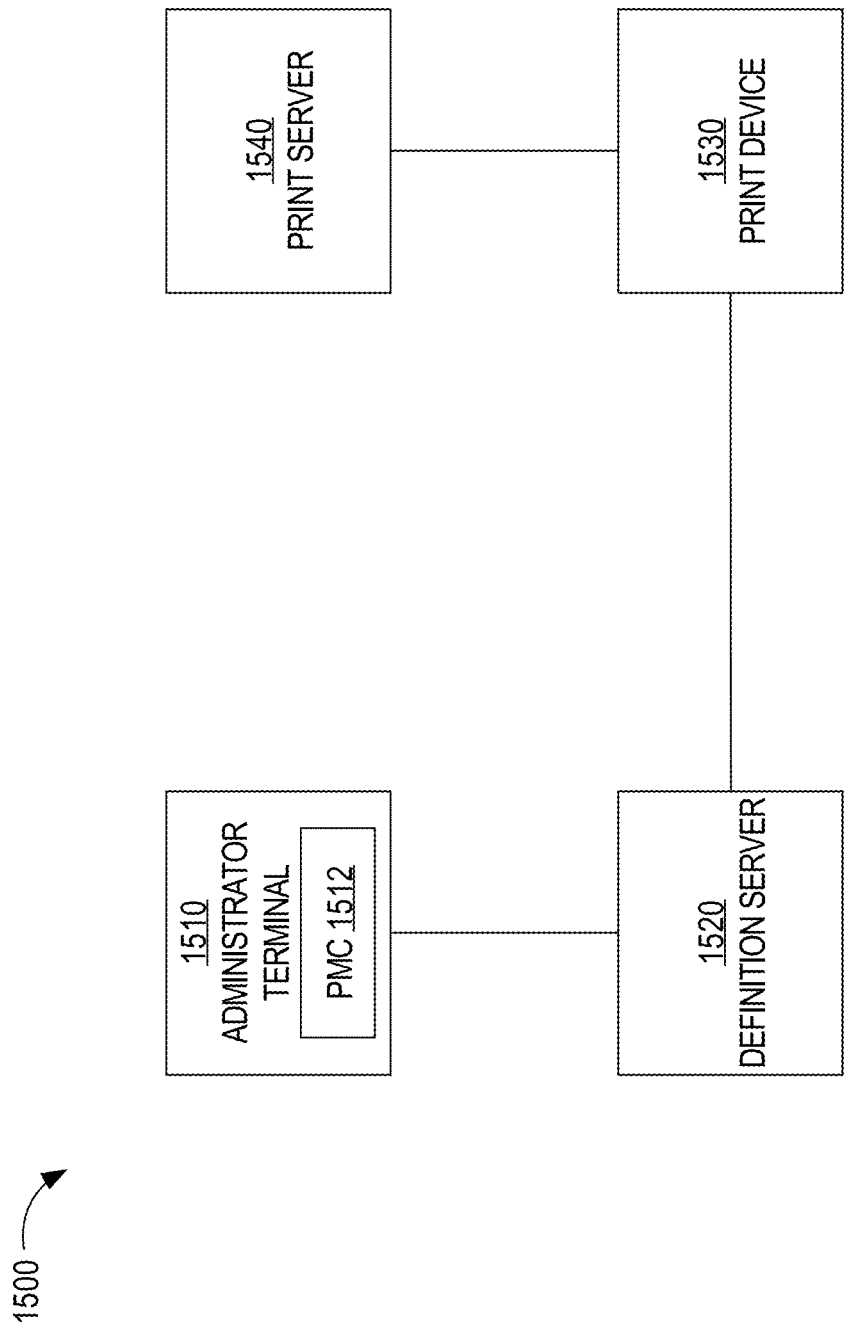
FIG. 15 is a block diagram that depicts a distributed print management (DPM) system, in an embodiment.

FIG. 15 is a block diagram that depicts a distributed print management (DPM) system 1500, in an embodiment. DPM system 1500 includes an administrator terminal 1510, a definition server 1520, a print device 1530, and a print server 1540. Although only a single print device is depicted, DPM system 1500 may include multiple print devices, each of which is communicatively coupled to definition server 1520 and print server 1540.

A. Administrator Terminal

Similar to administrator terminal 110, administrator terminal 1510 includes a print management console (PMC) 1512 that allows an administrator to define print process definitions. Administrator terminal 1510 may be administrator terminal 110 and, thus, also include SMC 112. Alternatively, B. Print Process Definition A print process definition specifies a set of print settings that may be used to generate a printed version of an electronic document represented in print data that is sent to the printing device. Examples of print settings include duplex, color/grayscale, orientation, and paper size.

A print process definition may also include destination data that indicates one or more destinations to which data about a print job that uses the print process definition is to be stored. Such destination data may indicate one or more destinations, such as an email address, a storage service that is outside DPM system 1500), or a network folder.

A print process definition may also include user access right data that is similar in content as user access rights data 330 described previously. For example, the user access right data may indicate who is allowed access to the print process definition. The user access right data may indicate that anyone is able to use the print process definition, one or more groups that are allowed to use the print process definition, or one or more individuals who are allowed to use the print process definition.

A print process definition may also include extension data that is used similar to the extension data described previously with respect to scan process definitions.

C. Definition Server

Once defined, PMC 1512 transmits print process definitions to definition server 1520, which stores the print process definitions. Definition server 1520 is configured to respond to requests, from PMC 1512, for print process definitions to edit at administrator terminal 1510. Definition server 1520 may be configured to maintain a current version of a print process definition and one or more previous versions of the print process definition and allow a PMC 1512 to request a particular version of a print process definition.

Definition server 1520 is also configured to respond to requests, from a print device (e.g., print device 1530), for print process definitions. A request from a print device includes data that definition server 1520 uses to select one or more print process definitions from among multiple print process definitions. Such data may include a username and password that a user provides in association with print device 1530. For example, a user enters his/her username and password using a keyboard provided by print device 1530. In response to receiving the user-related information, definition server 1520 determines which print process definitions are associated with the user-related information. For example, definition server 1520 may determine, based on the user-related information, whether the user is associated with any groups. If so, definition server 1520 identifies one or more groups and then determines which print process definitions are associated with each group of the one or more identified groups.

In response to identifying one or more print process definitions based on a request from print device 1530, definition server 1520 provides print process definition identification data to print device 1530. The print process definition identification data identifies one or more print process definitions. The print process definition identification data may include the actual one or more print process definitions or may only identify the one or more print process definitions. In case of the latter scenario, print device 1530 displays, on a display screen associated with print device 1530, data that identifies the one or more print process definitions. The print device 1530 allows a user to select a print process definition identifier from among one or more print process definition identifiers. In response to receiving input that selects a particular print process definition identifier, print device 1530 sends, to definition server 1520, selection data that identifies the print process definition that the user selected. In response, definition server 1520 sends the selected print process definition to print device 1530.

D. Print Device

Print device 1530 is a computing device that is configured to process print jobs, each of which involves generating a printed version of an electronic document represented in print data. The printed version comprises one or more printed documents on a tangible medium, such as paper. The printing of the printed document(s) is based on one or more print settings indicated in a print process definition retrieved from definition server 1520. Print device 1530 may be a multifunction peripheral (MFP) that provides one or more other non-print services, such as a scan service, a fax service, and/or an archive service.

Print device 1530 includes an interface that allows a user to initiate (or at least complete) a print job. The interface may comprise a display screen for displaying data and selectable buttons for initiating a print job. Print device 1530 may include other buttons, some of which may be physical and others of which may be graphical.

Before a user initiates a print operation at print device 1530, print device 1530 authenticates the user. For example, print device 1530 may have an attached badge reader that is capable of reading data from a badge of a user. The data may be one or more values that print device 1530 reads and sends to definition server 1520 in order to authenticate the user.

1. Locked Printing

In an embodiment, print device 1530 is configured with a feature known as "locked printing" to provide control over the printing of electronic documents. According to this feature, after print device 1530 receives print data, print device 1530 does not immediately generate a printed version of an electronic document represented in the print data. Instead, the print device 1530 waits until a user accesses the print device 1530 and requests that a print job be processed. A user may be granted access to locked print jobs only after a password is verified at print device 1530. A user enters a password through an operation panel on print device 1530. Print device 1530 verifies the password and, if the password is successfully verified, allows a printed version of the electronic document represented in the print data to be generated, i.e., printed. Print device 1530 may display one or more print jobs, each of which is associated with a different set of print data that the user (or someone associated with the user) caused to be transmitted to print device 1530 (or storage that is accessible to print device 1530).

In this "locked printing" embodiment, print device 1530 may transmit this same password (and, username, if applicable) to definition server 1520 in order to retrieve a list of one or more print process definitions from definition server 1520. One benefit of this approach is that a user is not required to enter his/her password multiple times. Instead, the same user credentials that are used to "unlock" the user's print job are used to retrieve a print process definition that is used to perform a print operation.

2. Print Job Completion Data

In an embodiment, after generating a printed version of an electronic document, print device 1530 generates print job completion data. Print job completion data includes information about the print job, such as data that identifies who initiated the print job, who was authenticated at print device 1530, at time at which the print job was executed, how many pages were printed, whether color was used, the size of the printed documents, which print process definition was used, and/or another print setting used to generated the printed version.

Print device 1530 may store the print job completion data locally on print device 1530. Another service that executes on a device that is separate from print device 1530 may then access storage on print device 1530 and retrieve print job completion data associated with one or more print jobs.

Alternatively, print device 1530 sends the print job completion data to another device that is responsible for making the print job completion data available to one or more external applications that are outside DPM system 1500. For example, print device 1530 sends print job completion data to print server 1540. The decision on sending print job completion data to print server 1540 may be based on (a) destination data that is indicated in the print process definition that was used to generate the printed version or (b) destination data that was specified by a user at print device 1530. The destination data may identify print server 1540 or may simply be an indication that the print job completion data is to be processed within DPM system 1500. Alternatively, the decision on sending print job completion data to print server 1540 may be due to print device 1530 being pre-configured (e.g., "hard-coded") to automatically send print job completion data to print server 1540 after print device 1530 generates the print job completion data.

E. Print Server

Print server 1540 receives print job completion data from print device 1530 (and, optionally, one or more other print devices, not depicted in FIG. 15). If print server 1540 is configured as a scan server (similar to scan server 140), then print server 1540 may be configured to "expect" one or more images files in one of multiple formats. Print server 1540 may, thus, be configured to check for certain file extensions, such as .pdf, .tif, .png, or .jpg. Thus, in an embodiment, print device 1530 adds, to the print job completion data, an image file extension that is recognizable to print server 1540. Thus, print device 1530 may store file extension data that identifies only image file extensions that print server 1540 recognizes.

Print server 1540 causes the print job completion data to be stored based on one or more criteria. The one or more criteria may indicate where to store the print job completion data. For example, if destination data accompanies print job completion data from print device 1530, then print server 1540 may send the print job completion data to one or more destinations indicated in the destination data. Example destinations include a network folder (that is located in a network that is "local" to print server 1540), a third party storage service (that is located in a remote network), or a set of one or more email addresses. The destination data may indicate any combination of these example destinations. Furthermore, the destination data may be supplied by a user at print device 1530, included in a print process definition retrieved from definition server 1520, or both. For example, (1) a user may enter a personal email address to which print server 1540 is to send print job completion data and (2) a print process definition that the user selects may include a name of a network folder to which print server 1540 is to store the print job completion data.

Alternatively, print server 1540 may be configured to store all print job completion data that print server 1540 receives in the same location. Such an embodiment may be used for all print jobs or only for print jobs where no destination data accompanies the resulting print job completion data.

In an embodiment, prior to causing print job completion data to be stored at one or more destinations, print server 1540 validates the print process definition (referred to herein as the "received definition") that includes the print settings that were used to create the printed version. Validation may involve print server 1540 sending the received definition (i.e., received from print device 1530) to definition server 1520. Definition server 1520 determines whether the received definition matches a print process definition (referred to herein as the "original definition") that definition server 1520 provided to print device 1530. A "match" may be an exact match between the two print process definitions. Alternatively, a "match" may be an exact match of one or more portions of the original definition that have been designated as unalterable with the corresponding one or more portions of the received definition.

If definition server 1520 provides a response that indicates that the received definition matches the original definition, then print server 1540 continues processing the print job completion data. Else, print server 1540 may send a notification to print device 1530 that the received definition identified is not valid. Also, print server 1540 might not cause the print job completion data to be stored at the appropriate or designated destination(s).

In an embodiment, print server 1540 maintains an event log that logs information regarding different print jobs. The event log may store, for each print job, data that indicates one or more of what print device was involved, when the print job was performed, which print process definition was used, where the corresponding print job completion data is stored, who initiated the print job, and whether or which print settings were modified by a user. The event log may be stored on the same device that executes the print server or on a separate device. An event manager that is separate from the print server may be configured to manage event subscriptions, analyze the event log to determine whether any events of interest have occurred, and, in response to determining that events of interest have occurred, transmit event notifications to one or more event sinks associated with the relevant event subscriptions.

F. Services that Leverage Print Job Completion Data

Once print job completion data is created and stored for one or more print jobs, such information may be analyzed by one or more services. An example of a service that may use print job completion data is a cost recovery service. A cost recovery service may analyze the print job completion data and determine how much to charge an individual, a group, or a company for using print device 1530 (and, optionally, other print devices in DPM system 1500). The cost recovery service may take into account one or more factors in determining how much to charge for use of print device 1530. Examples of such factors include, without limitation, for all or certain print jobs, how many pages were printed, whether color was used, how much toner was used, who initiated the print jobs, when print jobs were executed (e.g., time of day, week, month, and/or year).

After print server 1540 causes the print job completion data to be stored at a particular location, a service (such as a cost recovery service) determines that print job completion data is available at the particular location. The service may make this determination in one of several ways. For example, the service may periodically poll a network folder, an email account, or a shared storage account to determine whether scan data and rights management data has been stored therein since a previous polling action. As another example, a listener process at the particular location detects the storage of the scan data and sends a message to the service.

A service may access print job completion data in one or more of multiple ways. For example, the service may send, to print device 1530, a request for print job completion data. The service may send the request periodically or in response to detection of an event. The request may be for all print job completion data stored at print device 1530. Alternatively, the request may specify one or more criteria that print device 1530 may use to identify a subset of the print job completion data that satisfy the one or more criteria. Examples of criteria include a date range in which the corresponding print job was executed, a time of day in which the corresponding print job was executed, an identity of the user that initiated the corresponding print job, an identity of the print process definition, an indication of one or more print settings that were used to execute the corresponding print job.

As another example, the service may directly access one or more storage locations in which print server 1540 stores the print job completion data. For example, as noted above, a possible storage location is an email account, to which the service may have access.

A service (such as a cost recovery service) may execute on the same device as print server 1540 or on a separate device therefrom, such as a device that is outside DPM system 1500. For example, a cost recovery service or even remote relative to DPM system 1500. Thus, the cost recovery service may be a third party service relative to the entity that provides DPM system 1500.

G. Extending Scan Management System to Other Contexts

While printing is one context in which scan management techniques (e.g., employing administrative terminals and/or process definitions) may be extended, scan management techniques may be extended for other contexts. For example, although not depicted, scan device 130 may be instead a computing device that includes a digital camera. The computing device may be smartphone or tablet computer with a touchscreen display.

The computing device may communicate with a definition server to retrieve one or more "capture" process definitions. The one or more "capture" process definitions include picture settings that are used by the computing device to generate a digital image (i.e., "take a picture"). Alternatively, a capture process definition may be stored on the computing device itself.

Similar to a scan process definition, a capture process definition may also include access data that indicates a set of one or more users who are able to use the capture process definition. Additionally or alternatively, a capture process definition may include device management data that is used to determine whether a computing device is allowed to use the capture process definition to generate a digital image. "Device management data" is described in more detail below.

Similar to a scan process definition, a capture process definition may also include destination data that indicates where a digital image (that is generated based on the capture process definition) is to be stored, whether locally or remotely. The destination data may be processed by "picture server," similar to scan server 140, described previously. Alternatively, the destination data may be processed by the computing device that generates the digital image that is to be processed.

VI. Device Management

As described previously, a scan process definition is associated with one or more users. If any of the one or more users in an organization desires to use the scan process definition in performing a scan operation, the scan process definition is requested from definition server 120 and transmitted to the scan device that the user is currently using. The number of scan devices in the organization may be significant. Thus, any scan device in the organization may be used to retrieve the scan process definition.

However, in an embodiment, one or more scan process definitions are limited or restricted to a strict subset of scan devices in an organization. The restriction of a scan process definition to a set of one or more scan devices may be specified in association with the scan process definition. The data that is associated with one or more scan devices and that indicates one or more restrictions with respect to the one or more scan devices is referred to herein as "device management data."

A. Device Management Data

Device management data indicates one or more scan devices, each of which is allowed to use a scan process definition to generate scan data. Device management data may specify one or more individual scan devices or one or more ranges of identifiers (e.g., an IP address range) that each correspond to multiple possible scan device identifiers. An individual scan device is distinguished from other scan devices using a scan device identifier that is unique at least relative to other scan devices in DSM system 100. Examples of a scan device identifier include, without limitation, an IP address, a MAC address, or a GUID (or globally unique identifier).

Additionally or alternatively, multiple scan devices may be associated with the same scan device group identifier. In this way, restricting which scan devices are allowed to use a scan process definition may be enforced on a device group basis rather than on an individual scan device basis.

Device management data "indicates" one or more scan devices by either including one or more identifiers of the one or more scan devices or by including one or more identifiers of one or more other scan devices. For example, device management data may identify scan device X, which may signify that only scan device X is allowed to use a scan process definition to generate scan data. As another example, device management data may identify scan device X, which may signify that any scan device other than scan device X is allowed to use a scan process definition to generate scan data.

FIG. 16 depicts an example scan process definition that includes device management data, in an embodiment. In this example, the device management data is located within two different IHV elements. Each of the two IHV elements includes a different unique identifier for a scan device.

In a related embodiment, in addition to indicating one or more scan devices, device management data indicates one or more restrictions with respect to a scan job that is executed (or will be executed) at a scan device. An example of a restriction is one or more destinations that are not allowed to receive scan data generated by a scan device. For example, device management data may indicate that scan data generated at a particular scan device using a scan process definition is not to be sent to any email address outside of a business organization. In this way, one scan device in one location or department of a business organization may be allowed (based on a scan process definition) to send generated scan data to any recipient while another scan device in a different location or department of the business organization may be restricted (based on the same scan process definition) on the target recipients of generated scan data.

Another example of an additional restriction is when a scan operation is allowed to be performed. For example, device management data within a scan process definition may indicate that a scan operation is not allowed at a particular scan device after 9 PM on weekday nights or anytime on a weekend.

Figure 17:
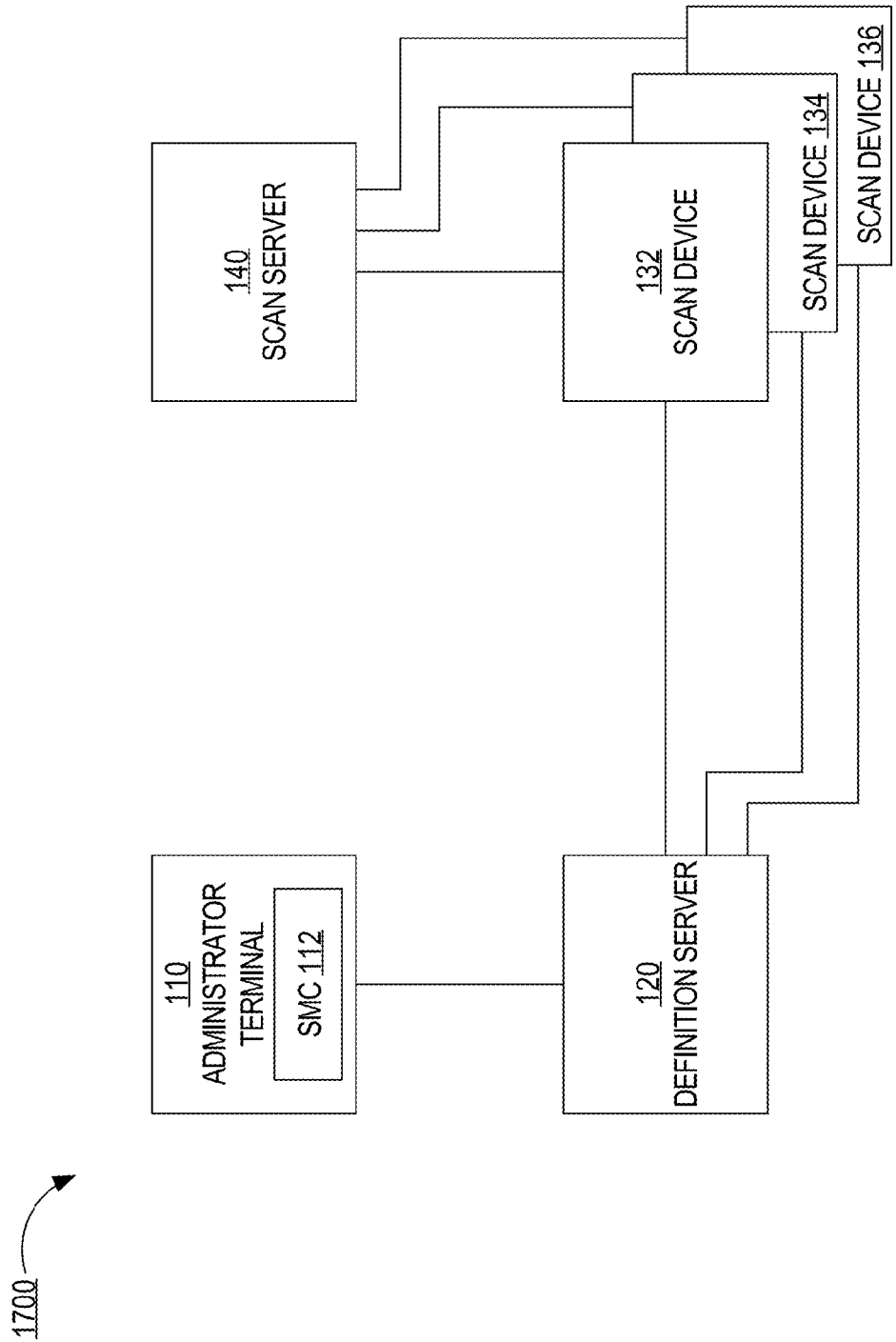
FIG. 17 is a block diagram that depicts an example distributed scan management (DSM) system that includes multiple scan devices, in an embodiment.

FIG. 17 is a block diagram that depicts an example distributed scan management (DSM) system 1700 that includes multiple scan devices, in an embodiment. DSM system 1700 is similar to DSM system 100, except that DSM system 1700 includes multiples scan devices 132, 134, and 136. Each of scan devices 132-136 is communicatively coupled to definition server 120 and to scan server 140 and is capable of requesting and receiving, from definition server 120, multiple scan process definitions. Also, each of scan devices 132-136 is capable of generating scan data based on scan process definitions and transmitting the scan data (and, optionally, the scan process definitions) to scan server 140.

Figure 18:
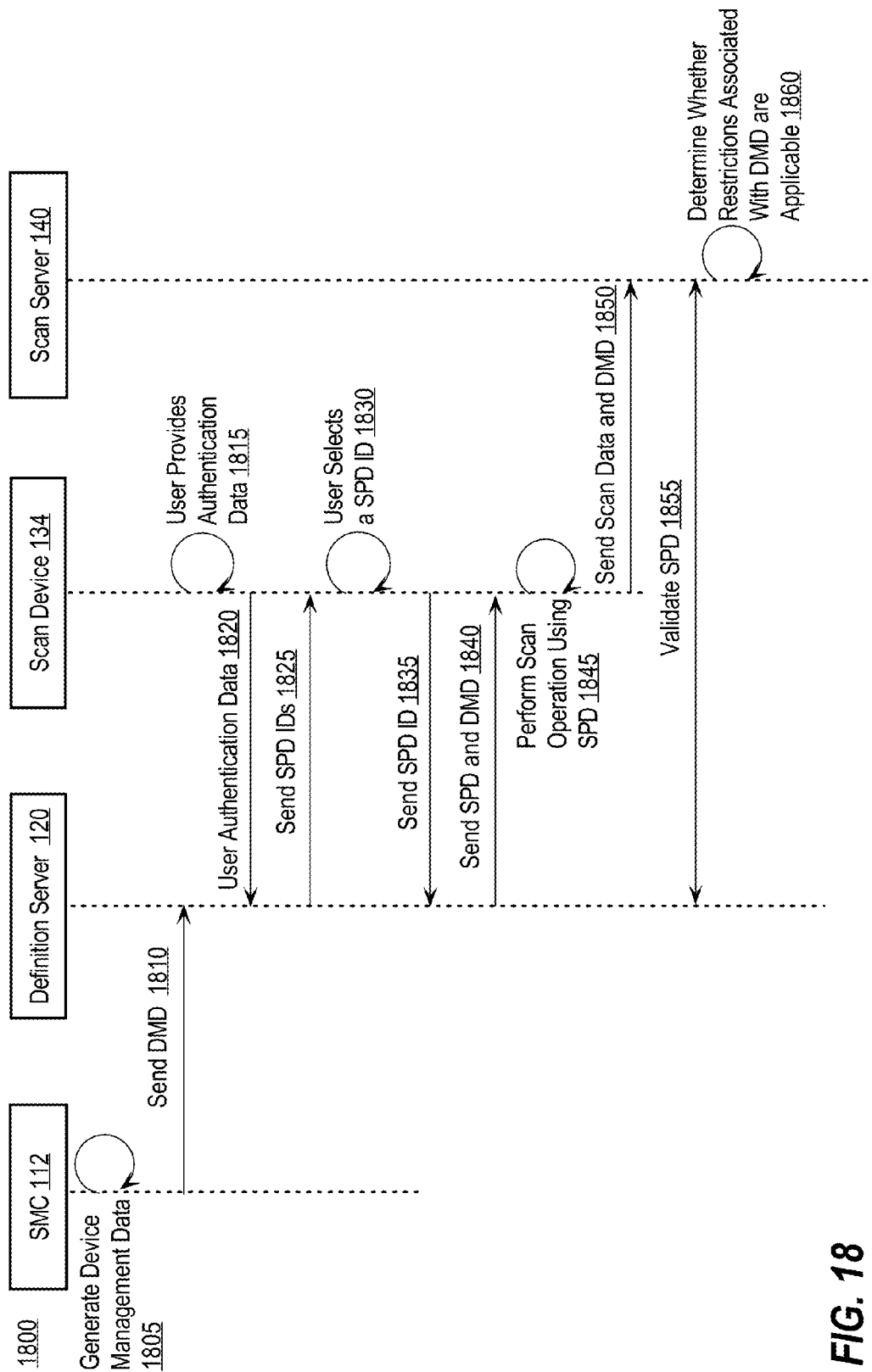
FIG. 18 is a sequence diagram that depicts a process for creating and using device management data, in an embodiment.

FIG. 18 is a sequence diagram that depicts a process 1800 for creating and using device management data, in an embodiment. At step 1805, an administrator at administrator terminal 110 specifies device management data. The administrator may specify the device management data while creating a scan process definition using SMC 112.

Additionally or alternatively, an administrator may use SMC 112 to send a request to definition server 120 for an already-created scan process definition stored therein. The administrator then uses SMC 112 to specify device management data and add (or modify) the device management data to the requested scan process definition. For example, a scan device is added to DSM system 1700. In light of this addition, an administrator, at terminal 110, retrieves one or more scan process definitions and adds, to the device management data of each scan process definition, a scan device identifier that identifies the new scan device.

B. Storing Device Management Data

At step 1810, SMC 112 sends the device management data to definition server 120 to be stored in association with a scan process definition.

In an embodiment, device management data is specified or indicated within a scan process definition. If the scan process definition is formatted as an XML document, then device management data may be specified as extension data within the XML document. For example, device management data may be specified within an individual hardware vendor (IHV) element of the XML document.

In a related embodiment, device management data is stored separately from, but in association with, a scan process definition. For example, definition server 120 stores a mapping that associates (1) one or more scan process definitions with (2) device management data. The mapping is stored separately from any scan process definition.

C. Processing Device Management Data

After device management data is stored in association with a scan process definition, the device management data may be processed at different times and/or by different entities. For example, processing device management data that is associated with a scan process definition may be performed before or after a scan job that relies on the corresponding scan process definition in question is executed. Also, in different embodiments, definition server 120, a scan device (e.g., scan device 130), scan server 140, or a device outside of DSM system 1700 processes device management data.

Processing device management data involves reading the device management data and enforcing one or more restrictions indicated by the device management data with respect to a scan job. Such enforcing may involve, for example, determining whether a scan device identifier is specified within the device management data or determining whether a specified destination of generated scan data is allowed to receive the scan data. For example, the entity enforcing one or more restrictions indicated in device management data determines whether scan device identification data is included in the device management data. As noted above, the inclusion of a scan device identifier within device management data may indicate that the scan device is/was not allowed to generate the corresponding scan data or may indicate that the scan device is/was allowed to generate the corresponding scan data.

Device management data is said to "satisfy one or more criteria" if the entity that processes the device management data with respect to a scan job determines that no restriction associated with the device management data needs to be enforced. For example, the scan job should be executed or, if already executed, the scan data generated from the scan job should be processed according to post-scan processing instructions indicated in the corresponding scan process definition.

Device management data is said to "not satisfy one or more criteria" if the entity that processes the device management data with respect to a scan job determines that a restriction associated with the device management data needs to be enforced. For example, the scan job should not be executed or, if the scan job has already been executed, then the scan data generated therefrom should not be processed according to post-scan processing instructions indicated in the corresponding scan process definition.

1. Post-Scan Processing of Device Management Data

In an embodiment, device management data is processed after corresponding scan data is performed. Such post-scan processing of device management data may be performed by scan server 140 or a device (not depicted) that is outside of DSM system 1700.

In this embodiment, process 1800 is similar to process 800 of FIG. 8 in some respects. At step 1815, a user provides user authentication data (e.g., a username and password) to scan device 134. At step 1820, scan device 134 sends the user authentication data to definition server 120. At step 1825, definition server 120 sends data that identifies one or more scan process definitions to scan device 134, which displays the data. At step 1830, the user selects one of the listed scan process definitions. At step 1835, scan device 134 sends an identifier for the requested scan process definition to definition server 120.

At step 1840, definition server 120 sends the requested scan process definition to scan device 134. Definition server 120 also sends device management data that is associated with the scan process definition. As indicated previously, the scan process definition may include the device management data. Alternatively, definition server 120 may send the device management data separately from the scan process definition. At step 1845, scan device 134 performs a scan operation based on scan settings indicated in the scan process definition.

At step 1850, scan device 134 sends, to scan server 140, scan data that is generated based on performing the scan operation. Step 1850 also comprises sending the device management data to scan server 140.

At step 1855, scan server 140 communicates with definition server 120 to validate the scan process definition that was used to perform the scan operation. Step 1855 is optional.

At step 1860, in response to receiving device management data in association with scan data, scan server 140 determines whether any of the one or more restrictions indicated in the device management data are applicable. For example, scan server 140 determines whether scan device 134 (i.e., that generated the scan data) was allowed to process the scan process definition that was used to generate the scan data. In order to make this determination, scan server 140 receives scan device identification data that identifies scan device 134. As another example, scan server 140 determines whether one or more storage destinations (e.g., specified by the user at scan device 134 or indicated in destination data of the scan process definition) for the received scan data are allowed based on the device management data.

If scan server 140 determines that no restriction indicated in the device management data is applicable, then scan server 140 stores the scan data according to post-scan instructions indicated in the corresponding scan process definition.

If scan server 140 determines that at least one restriction indicated in the device management data is applicable, then scan server 140 performs one or more operations. Depending on the restriction, scan server 140 may or may not store the scan data. For example, if the restriction is regarding a destination of the scan data (e.g., an email address), then scan server 140 may send a message to scan device 134 to prompt the user to specify a valid destination (e.g., a different email address). As another example, if the restriction is regarding when the scan operation was performed, then the scan data may not be stored according to instructions indicated in the corresponding scan process definition. Such operations may include creating and storing (e.g., in a log file) data that indicates that the scan device performed a scan operating using an improper scan process definition. In this embodiment, scan server 140 acts as a single source with which an administrator may interact in order to discover which scan jobs were performed contrary to device management data. If such data was stored at the scan device that performed the respective scan operation, then an administrator might have to individually check log files of each scan device that the administrator manages.

Another example operation is sending, to the scan device that generated the scan data, a message that an error occurred and that the scan data will not be processed as the user intended. The message may prompt the user to select a different scan process definition use that scan process definition to perform another scan operation so that the scan data generated therefrom is processed as the user intends.

As noted previously, instead of scan server 140 performing the post-scan processing of device management data, another device performs post-scan processing of device management data. For example, a service executing on a device outside of DSM system 1700 determines that scan data has been generated. The service may detect that scan data has been generated in one of multiple ways, as described previously. For example, the service may periodically analyze one or more log files that were created and stored by scan server 140. As another example, the service may detect that scan data has been stored at a particular location (e.g., by scan server 140).

The service reads device management data that is stored in association with the scan data. If the service determines that the device management data satisfies one or more criteria (e.g., if the service determines that the device management data includes scan device identification data), then the service performs its normal function. If the service determines that the device management data does not include the scan device identification data, then the service may perform one or more operations. For example, the service may create and store data that indicates that an improper scan process definition was used to generate the scan data. Additionally, the service may notify an administrator of DSM system 100, such as by sending, to administrator terminal 110, a message that indicates information about the scan operation.

2. Pre-Scan Processing of Device Management Data

In an embodiment, device management data is processed before the corresponding scan operation is performed. The processing of device management data may be performed by definition server 120 or a scan device (such as scan device 130).

i) Definition Server Processes Device Management Data

Figure 19:
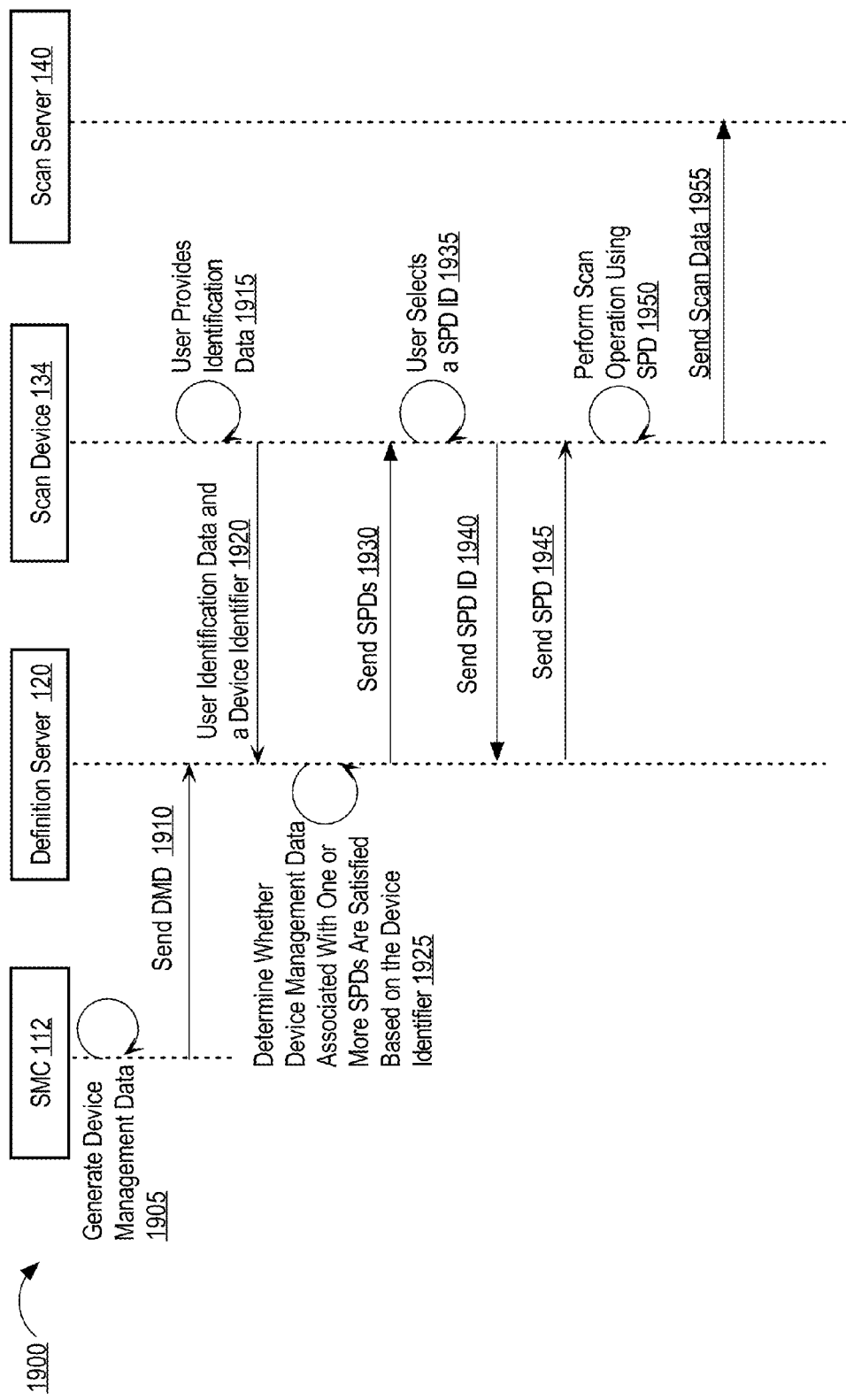
FIG. 19 is a sequence diagram that depicts a process for enforcing restrictions device management data prior to performing a scan operation, in an embodiment.

FIG. 19 is a sequence diagram that depicts a process 1900 for enforcing restrictions device management data prior to performing a scan operation, in an embodiment. At step 1905, an administrator at administrator terminal 110 specifies device management data. At step 1910, SMC 112 sends the device management data to definition server 120 to be stored in association with a scan process definition.

At step 1915, a user provides user identification data (e.g., a username and password) to a scan device, such as a scan device 130. At step 1920, the scan device sends, to definition server 120, a request that includes the user identification data and an identifier that identifies the scan device.

At step 1925, definition server 120 may first identify one or more scan process definitions that are associated with the user identification data and then determine whether the device management data associated with each identified scan process definition satisfies one or more criteria. Alternatively, definition server 120 first identifies one or more sets of device management data that are satisfied and then determines whether the scan process definitions that are associated with the identified one or more sets of device management data are associated with the user identification data.

At step 1930, definition server 120 sends data that identifies one or more scan process definitions to the scan device, which displays the data.

Alternatively, if definition server 120 determines, based on device management data, that scan device 134 is restricted from using any scan process definition (including those definitions that are associated with user access right data that identifies the user as authorized to use the scan process definitions) then definition server 120 may send, to scan device 134, a message that informs the user that no scan process definition is available. The message may include one or more reasons for the unavailability and/or prompt the user to use a different scan device. The message may even identify one or more other scan devices that the user may use.

At step 1935, the user selects one of the listed scan process definitions. At step 1940, the scan device sends an identifier for the requested scan process definition to definition server 120.

At step 1945, definition server 120 sends the requested scan process definition to scan device 134. Definition server 120 may also send the device management data that is associated with the scan process definition. Scan device 134 may use the device management data to determine whether the device management data satisfies one or more criteria. In this way, both definition server 120 and the scan device (e.g., scan device 130) take part in enforcing restrictions indicated in device management data. For example, the scan device may enforce one or more additional restrictions, such as a temporal restriction and/or a scan data recipient restriction.

At step 1950, scan device 134 performs a scan operation using the scan settings indicated in the requested scan process definition.

At step 1955, scan device 134 sends the generated scan data to scan server 140 for further processing.

II) Scan Device Processes Device Management Data

While definition server 120 processes device management data in process 1900, in an alternative embodiment, a scan device (e.g., scan device 130) processes device management data.

Figure 20:
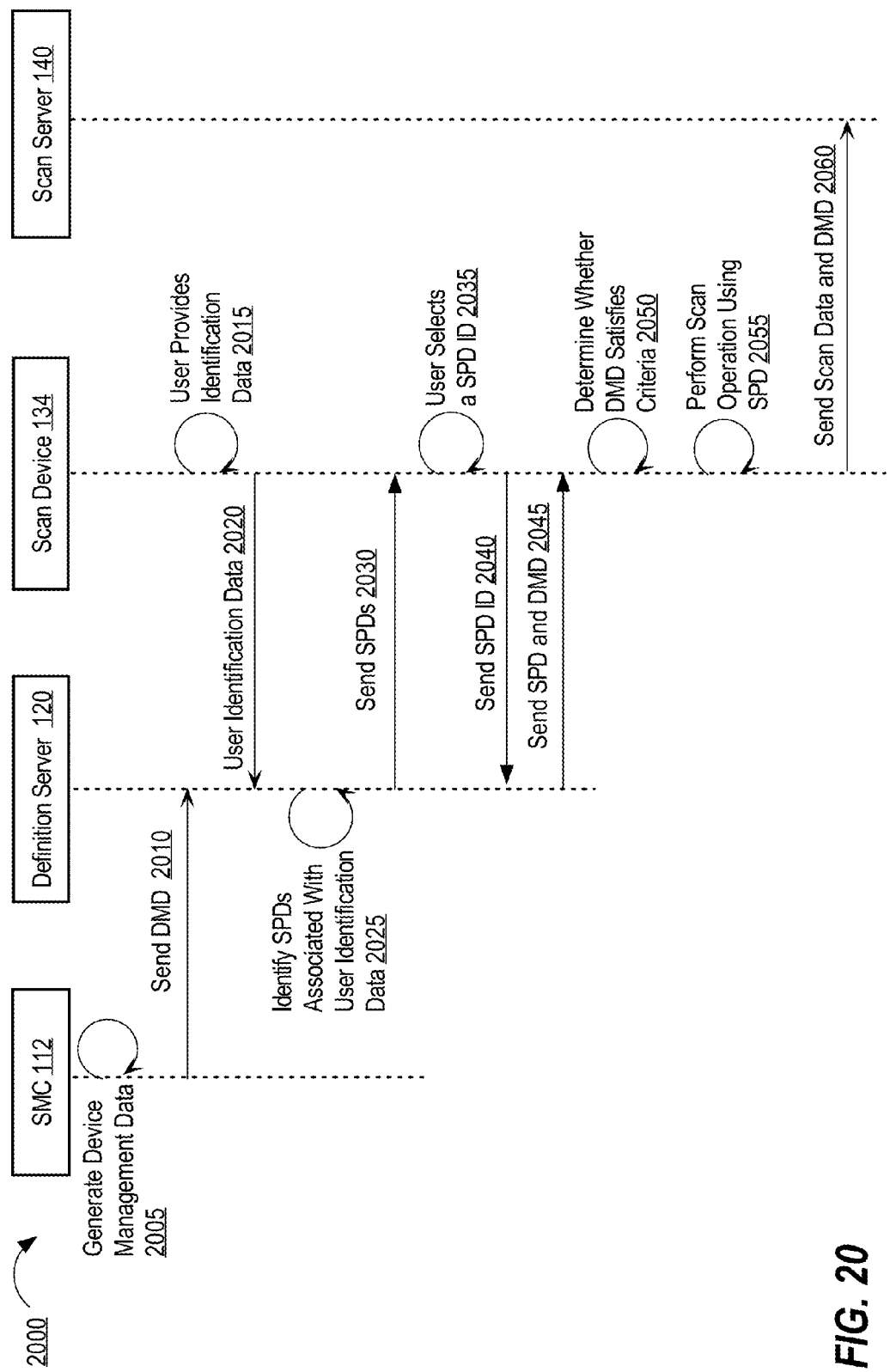
FIG. 20 is a sequence diagram that depicts a process for enforcing device management data prior to performing a scan operation, in an embodiment.

FIG. 20 is a sequence diagram that depicts a process 2000 for enforcing device management data prior to performing a scan operation, in an embodiment. At step 2005, an administrator at administrator terminal 110 specifies device management data. At step 2010, SMC 112 sends the device management data to definition server 120 to be stored in association with a scan process definition.

At step 2015, a user provides user identification data (e.g., a username and password) to a scan device, such as a scan device 130. At step 2020, scan device 134 sends, to definition server 120, a request that includes the user identification data.

At step 2025, definition server 120 identifies one or more scan process definitions that are associated with the user identification data. At step 2030, definition server 120 sends data that identifies one or more scan process definitions to scan device 134, which displays the data.

At step 2035, the user selects one of the listed scan process definitions. At step 2040, scan device 134 sends an identifier for the requested scan process definition to definition server 120.

At step 2045, definition server 120 sends the requested scan process definition to scan device 134. Definition server 120 also sends the device management data that is associated with the scan process definition. The scan process definition may include the device management data.

At step 2050, scan device 134 determines whether the device management data satisfies one or more criteria. If so, then, at step 2055, scan device 134 performs a scan operation using the scan settings indicated in the requested scan process definition. Process 2000 may then continue by sending, at step 2060, the generated scan data to scan server 140.

If the device management data does not satisfy the one or more criteria, then the scan device does not perform the scan operation using the requested scan process definition. Instead, the scan device may perform one or more other operations, such as causing, to be stored, a log entry that indicates that a user attempted to use a scan process definition whose associated device management data did not satisfy one or more criteria. The scan device may also display, on a user interface, a message that prompts the user to select a different scan process definition.

VII. Delegate Access

In some business environments, it is common for a business executive to delegate a task to another individual within a company. For example, a business executive, after traveling for a business trip, provides, to an assistant, receipts for expenses incurred on the business trip. The assistant scans the receipts and files an expense report for the business executive. The scanned receipts and expense report are sent (e.g., emailed) to an account associated with the business executive. One approach for allowing the assistant access to the business executive's account is to share the executive's username and password with the assistant. However, such an approach is not desirable because the likelihood that the business executive's username and password is discovered by an unscrupulous person (which may be the assistant) increases greatly.

Another approach is to create multiple similar, but different, scan process definitions: at least one for the business executive and at least one for the assistant. The scan process definition for the assistant will be almost identical to the scan process definition for the business executive, except there might be differences in that the assistant might not be authorized to modify any of the scan settings data or destination data in the scan process definition for the assistant. One downside of this approach is that an administrator needs to create, maintain, and differentiate between all these different, but similar, scan process definitions. Any change in one scan process definition might necessitate a change in a corresponding scan process definition. As user-involvement increases, the likelihood of errors also increases.

A. Access Delegation Data

According to an embodiment, access to a scan process definition is delegated to one or more users who otherwise would not have access to the scan process definition. Such one or more users are referred to herein as "delegatees." Data that identifies delegatees is referred to herein as "delegatee data."

The one or more users who are indicated in user access right data of a scan process definition are referred to as "delegators." Data that identifies delegators is referred to herein as "delegator data." A delegator may not have been involved in authorizing a particular user to be a delegatee of a scan process definition to which the delegator has access. Instead, an administrator, at administrator terminal 110, may make the decision(s) on who is a delegatee and, thus, who is a delegator.

Data that is used to determine whether a user is a delegatee of one or more scan process definitions is referred to herein as "access delegation data" with respect to the one or more scan process definitions. Depending on the specific implementation, access delegation data may include both delegatee data and delegator data or only delegatee data.

In an embodiment, not only is access delegation data associated with one or more scan process definitions, access delegation data may be associated with one or more restrictions. An example restriction includes the prohibition of modifying any data (or certain data) within a scan process definition. For example, while a delegator is allowed to modify a particular scan setting indicated in the scan settings data of a scan process definition, a delegatee is not allowed to modify the particular scan setting (or any scan setting).

Another example restriction is the prohibition of adding another destination to which scan data (that is generated based on the corresponding scan process definition) may be sent. For example, while a delegator may be allowed to add one or more destinations for a particular scan job, a delegatee is not allowed to add any destination to which scan data is to be sent. A related example restriction is the prohibition of adding certain destinations, such as an email address outside of a company's domain or a network folder that does not have certain access rights.

Another example restriction is when a scan operation based on the corresponding scan process definition may be performed. For example, while a delegator may be allowed to use a scan process definition at any time of the day, a delegatee of the scan process definition may only be allowed to use the scan process definition at certain times of the day and/or certain days of the week

1. Stored in Scan Process Definition

In an embodiment, a scan process definition includes both user access rights data and access delegation data. For example, a business executive may be identified in the user access rights data portion of a scan process definition while an assistant of the executive is identified in the access delegation data portion of the scan process definition. Thus, each user in the set of one or more users who are identified in the user access rights data may be different than each user that is identified in the user access rights data portion.

In an embodiment, access delegation data is specified in an extension point of a scan process definition, wherein the extension point is an optional portion of the scan process definition.

FIG. 21 depicts an example scan process definition that includes access delegation data, in an embodiment. In this example, access delegation data is included in multiple IHV "delegate" elements. Each delegate element includes: (1) a login-user element that indicates a user that has logged into a scan device and is seeking one or more scan process definitions; (2) a delegate-from element that indicates one or more delegators; and (3) an access right element that indicates one or more access rights that the delegatee has with respect to the scan process definition. In this example, both delegate elements indicate two delegators. Also, both delegate elements indicate that the corresponding delegatee has read-only rights to the scan process definition and is not allowed to modify the corresponding scan process definition. Such a prohibition may also include not being allowed to specify an additional (or different) destination to which scan data (that will be generated based on the scan process definition) will be sent.

In an embodiment, an administrator at administrator terminal 110 uses SMC 112 to specify access delegation data. Access delegation data may be formatted in a particular way, such as in XML. Alternatively, access delegation data may have very little formatting, even if the access delegation data is without a certain element of an XML document.

2. Stored Separate from Scan Process Definition

In an alternative embodiment, access delegation data is stored separately from any scan process definition. In such an embodiment, access delegation data includes one or more entries, where each entry includes (1) delegatee data that identifies one or more delegatees and (2) delegator data that identifies one or more delegators.

In a related embodiment, one or more entries in the mapping include definition identification data that identifies one or more scan process definitions. The definition identification data is used to allow only a strict subset of scan process definitions that a delegator is allowed to access to be "shared" with a delegatee. In this way, a delegator does not have to "share" all scan process definitions to which the delegator has access. For example, user1 may have access to scan process definitions A, B, and C while user2 does not have access to any of definitions A, B, or C. Later, user2 is identified as a delegatee of user1 in access delegation data. However, the access delegation data may further indicate that user2 is only a delegatee of user1 with respect to scan process definition B. Thus, while user2 may be able to use scan process definition B when initiating a scan operation, user2 may not use scan process definitions A or C when initiating a scan operation.

In one approach, approach, definition server 120 stores the access delegation data. In an alternative approach, a scan device (e.g., scan device 130) stores access delegation data. Both approaches, and variations thereof, are described in more detail as follows.

B. Processing Access Delegation Data

1. Definition Server Enforces Access Delegation Data

Figure 22:
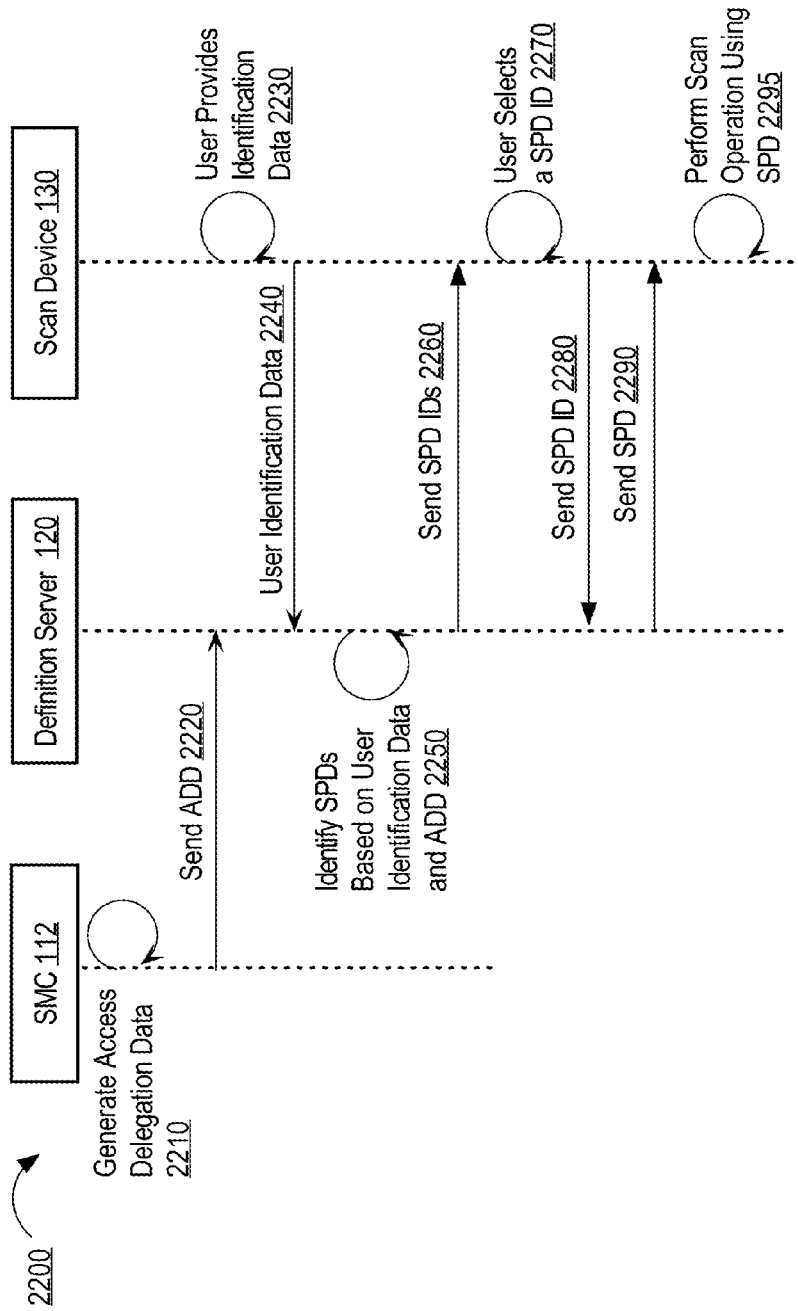
FIG. 22 is a sequence diagram that depicts a process for enforcing access delegation data at a definition server, in an embodiment.

FIG. 22 is sequence diagram that depicts a process 2200 that involves definition server 120 enforcing access delegation data, in an embodiment. At step 2210, an administrator at administrator terminal 110 uses SMC 112 to specify access delegation data for one or more scan process definitions. As noted previously, the access delegation data may be specified within the one or more scan process definitions or may be specified separately therefrom but in association with the one or more scan process definitions.

At step 2220, SMC 112 causes the access delegation data to be stored at definition server 120.

At step 2230, a user provides user identification data at scan device 130.

At step 2240, scan device 130 sends, to definition server 120, a request for scan process definitions. The request includes the user identification data.

At step 2250, definition server 120 identifies one or more scan process definitions based on the user identification data and/or the access delegation data. For example, in the scenario where the access delegation data is stored within one or more scan process definitions, definition server 120 analyzes each scan process definition of multiple scan process definitions. For each scan process definition, definition server 120 determines whether the user identification data is included in the user access right data and, if not in the user access right data, whether the user identification data is included in the access delegation data.

As another example, in the scenario where the access delegation data is stored separately from any scan process definition, definition server 120 determines whether the user identification data is included in the user access right data of each scan process definition and also determines whether any delegatee data of the access delegation data includes the user identification data. The latter determination may involve determining, for each mapping (if multiple mappings between delegatee data and delegator data exist), whether the delegatee data of that mapping includes the user identification data. If so, then definition server 120 identifies the matching delegator data, which identifies one or more delegators. Definition server 120 then determines whether any scan process definition includes user access right data that identifies any of the one or more delegators.

In either scenario, access delegation data may indicate one or more restrictions with respect to the corresponding scan process definition(s), such as the prohibition to modify any scan settings in the scan process definition(s) or the prohibition to add a destination for not-yet-generated scan data.

At step 2260, definition server 120 sends, to scan device 130, data that identifies one or more scan process definitions. In some situations, definition server 120 might identify two scan process definitions: one "normal" scan process definition that includes user access right data that includes the user identification data and another scan process definition that is associated with access delegation data that includes the user identification data.

Step 2260 may involve sending the entirety of the identified one or more scan process definitions. Alternatively, step 2260 involves sending only data that identifies the one or more scan process definitions.

At step 2270, a user selects one of the scan process definitions identified in the received data. Step 2270 may have involved scan device 130, based on the received data, causing one or more graphical user interface objects to be displayed, one for each scan process definition identified in the received data.

At step 2280, scan device 130 sends, to definition server 120, definition identification data that identifies the selected scan process definition. Definition server 120 may determine whether the selected scan process definition is one that includes user access right data that identifies the user or is one that was identified by definition server 120 based on access delegation data. If the latter, definition server 120 may determine whether any restrictions should be associated with the scan process definition when scan device 130 processes the scan process definition. If so, then definition server 120 ensures that scan device 130 enforces the restriction(s). For example, definition server 120 may modify scan settings data within the scan process definition or may modify destination data within the scan process definition.

At step 2290, definition server 120 sends the selected scan process definition to scan device 130. At step 2295, scan device 130 performs a scan operation based on the scan settings data indicated in the selected scan process definition.

2. Scan Device Enforces Access Delegation Data

In an embodiment, instead of definition server 120 enforcing the access delegation data, a scan device (e.g., scan device 130) enforces the access delegation data. The scan device may use the access delegation in one of two ways: either before sending a request for definitions to definition server 120 or after sending a request for definitions to definition server 120.

Figure 23:
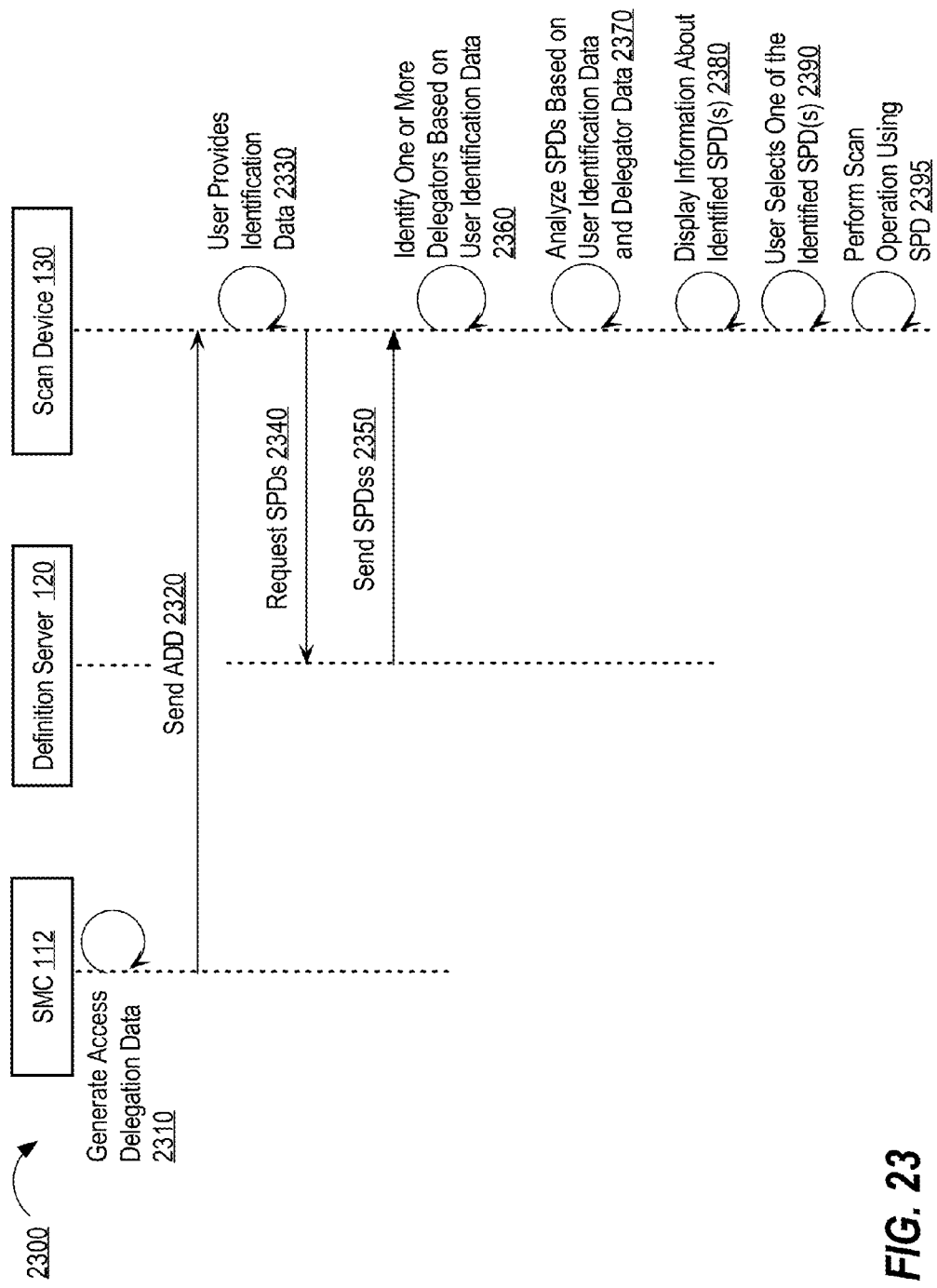
FIG. 23 is a sequence diagram that depicts a process for enforcing access delegation data at a scan device, in an embodiment.

FIG. 23 is a sequence diagram that depicts a process 2300 for enforcing access delegation data at a scan device, in an embodiment. Process 2300 is directed to the approach where scan device 130 enforces the access delegation data after sending a request for definitions to definition server 120.

At step 2310, an administrator at administrator terminal 110 uses SMC 112 to specify access delegation data. The access delegation data is specified separately from any scan process definition. The access delegation data includes a set of one or more mappings, where each mapping associates delegatee data with delegator data. One or more of the mappings in the set may also indicate the one or more scan process definitions.

At step 2320, SMC 112 causes the access delegation data to be stored at scan device 130.

At step 2330, a user provides user identification data at scan device 130.

At step 2340, scan device 130 sends, to definition server 120, a request for scan process definitions.

At step 2350, definition server 120 sends multiple (e.g., all) scan process definitions that it stores.

At step 2360, scan device 130 identifies, within the access delegation data, one or more delegators that are associated with a delegatee that is identified by the user identification data.

At step 2370, scan device 130 analyzes each scan process definition using the user identification data and delegator data that identifies the one or more delegators identified in step 2360. As a result of step 2370, scan device 130 identifies one or more scan process definitions. If the one or more scan process definitions include multiple scan process definitions, then one of the scan process definitions may have included the user identification data in the user access right data portion and another of the scan process definitions may have included delegator data in the user access right data portion.

At step 2380, scan device 130 causes information about the one or more identified scan process definitions to be displayed to the user.

At step 2390, scan device 130 receives, from the user, input that indicates a selection one of the one or more identified scan process definitions.

At step 2395, scan device 130 performs a scan operation based on the selected scan process definition. If the user selects a scan process definition that was only selected based on the access delegation data and the access delegation data indicated one or more restrictions with respect to the scan process definition, then step 2395 may involve scan device 130 enforcing the one or more restrictions.

Figure 24:
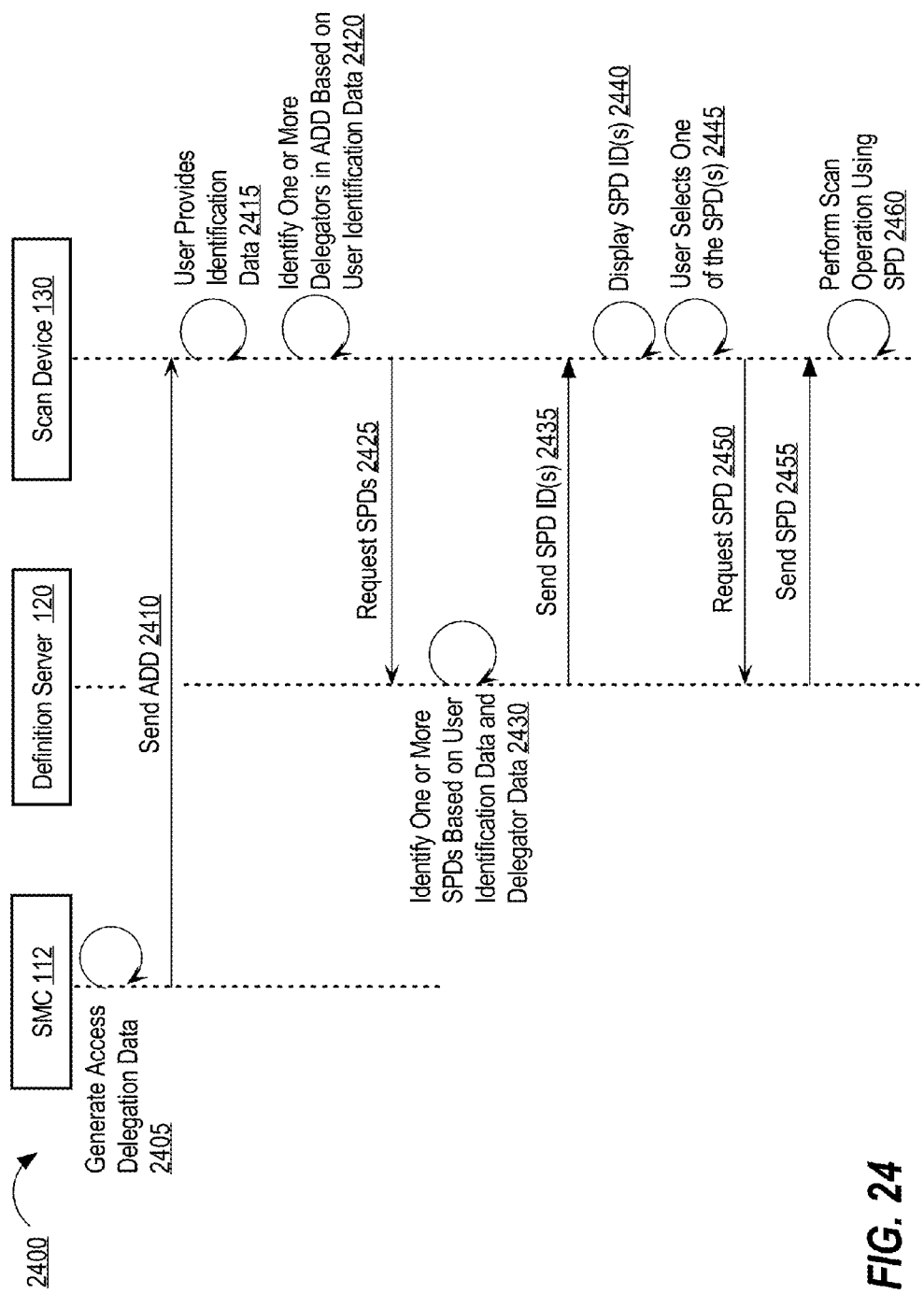
FIG. 24 is a sequence diagram that depicts a process for enforcing access delegation data at a scan device, in an embodiment.

FIG. 24 is a sequence diagram that depicts a process 2400 for enforcing access delegation data at a scan device, in an embodiment. Process 2400 is directed to an approach where scan device 130 enforces the access delegation data before sending a request for definitions to definition server 120.

At step 2405, an administrator at administrator terminal 110 uses SMC 112 to specify access delegation data. The access delegation data is specified separately from any scan process definition. The access delegation data includes a set of one or more mappings, where each mapping associates delegatee data with delegator data. One or more of the mappings in the set may also indicate the one or more scan process definitions.

At step 2410, SMC 112 causes the access delegation data to be stored at scan device 130.

At step 2415, a user provides user identification data at scan device 130.

At step 2420, scan device 130 analyzes the access delegation data based on the user identification data. Scan device 130 determines whether the user identification data is found within or is otherwise associated with delegatee data in the access delegation data. If so, then scan device 130 identifies delegator data that is associated with the identified delegatee data.

At step 2425, scan device 130 sends, to definition server 120, a request for scan process definitions. The request includes the user identification data and any delegator data that indicates a set of one or more delegators. If, within the access delegation data, the delegator data is associated with one or more scan process definitions, then scan device 130 also sends definition identification data that identifies the one or more scan process definitions.

At step 2430, definition server 120 analyzes multiple (e.g., all) scan process definitions that it stores and determines whether the user access right data of each scan process definition includes the user identification data or data that identifies a delegator indicated in the delegator data received from scan device 130.

At step 2435, definition server 120 sends data that identifies one or more scan process definitions that include user access right data that includes either the user identification data or delegator data that identifies one of the one or more delegators identified in the delegator data received from scan device 130. The data sent to scan device 130 may include the one or more identified scan process definitions or may exclude the one or more identified scan process definitions.

At step 2440, scan device 130 causes information about the one or more identified scan process definitions to be displayed to the user.

At step 2445, scan device 130 receives, from the user, input that indicates a selection one of the one or more identified scan process definitions.

At step 2450, scan device 130 sends, to definition server 120, a request for the selected scan process definition.

At step 2455, definition server 120 sends the requested scan process definition to scan device. Steps 2450 and 2455 are not necessary if definition server 120 already sent the scan process definition in step 2435.

At step 2460, scan device 130 performs a scan operation based on the selected scan process definition. Step 2460 may comprise identifying one or more restrictions associated with the delegatee, which is the user of scan device 130 in this scenario. The one or more restrictions may be indicated in the requested scan process definition. Additionally or alternatively, the one or more restrictions may be indicated in the access delegation data. If there are one or more restrictions, then scan device 130 enforces the restriction(s) before and/or after performing the scan operation.

VIII. Implementation Mechanisms

According to one embodiment, the approaches described herein are implemented by one or more special-purpose computing devices. The special-purpose computing devices may be hard-wired to perform the approaches, or may include digital electronic devices such as one or more application-specific integrated circuits (ASICs) or field programmable gate arrays (FPGAs) that are persistently programmed to perform the approaches, or may include one or more general purpose hardware processors programmed to perform the approaches pursuant to program instructions in firmware, memory, other storage, or a combination. Such special-purpose computing devices may also combine custom hard-wired logic, ASICs, or FPGAs with custom programming to accomplish the approaches. The special-purpose computing devices may be desktop computer systems, portable computer systems, handheld devices, networking devices or any other device that incorporates hard-wired and/or program logic to implement the approaches.

Figure 25:
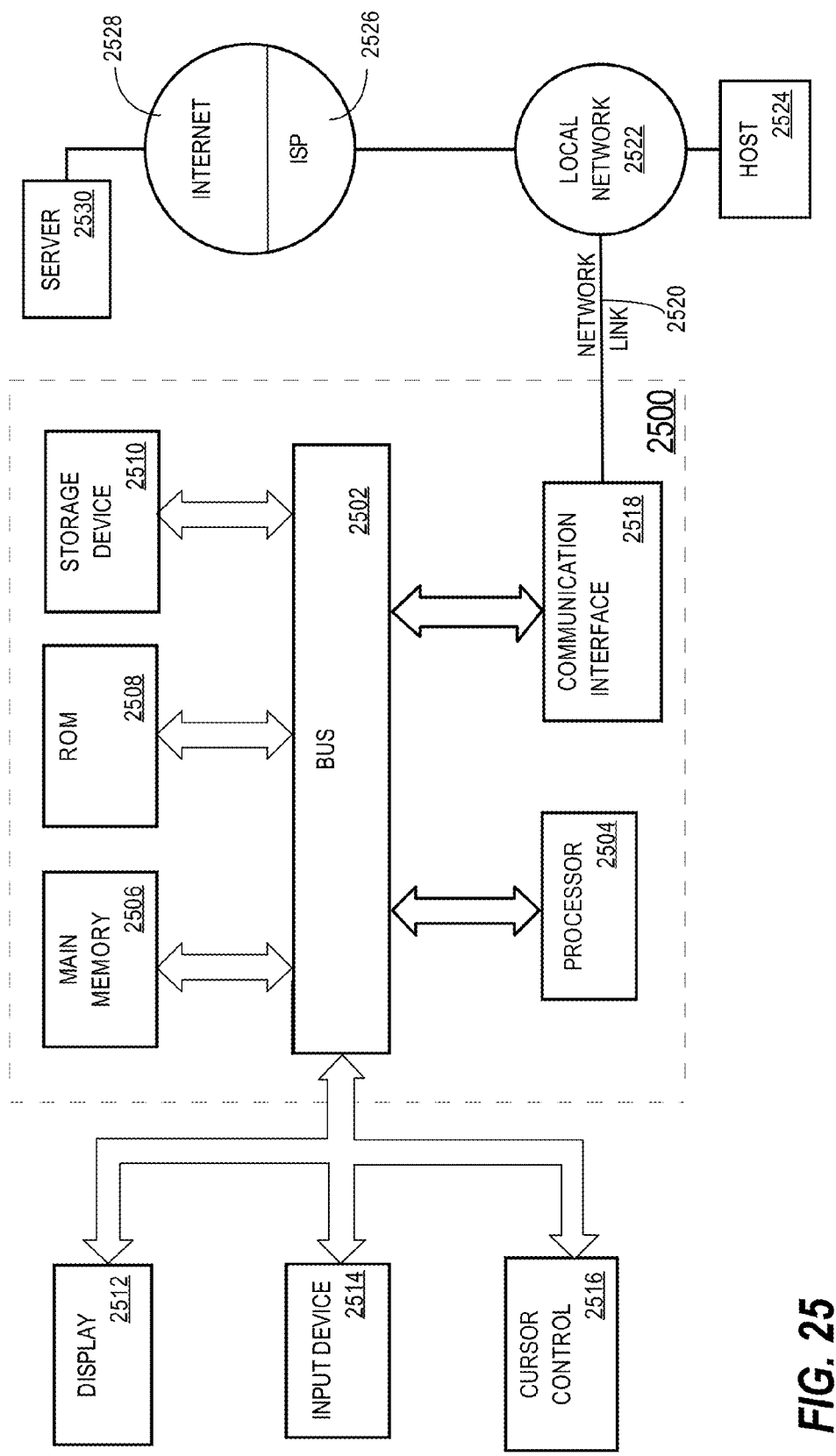
FIG. 25 is a block diagram that depicts an example computer system upon which embodiments may be implemented.

FIG. 25 is a block diagram that depicts an example computer system 2500 upon which embodiments may be implemented. Computer system 2500 includes a bus 2502 or other communication mechanism for communicating information, and a processor 2504 coupled with bus 2502 for processing information. Computer system 2500 also includes a main memory 2506, such as a random access memory (RAM) or other dynamic storage device, coupled to bus 2502 for storing information and instructions to be executed by processor 2504. Main memory 2506 also may be used for storing temporary variables or other intermediate information during execution of instructions to be executed by processor 2504. Computer system 2500 further includes a read only memory (ROM) 2508 or other static storage device coupled to bus 2502 for storing static information and instructions for processor 2504. A storage device 2510, such as a magnetic disk or optical disk, is provided and coupled to bus 2502 for storing information and instructions.

Computer system 2500 may be coupled via bus 2502 to a display 2512, such as a cathode ray tube (CRT), for displaying information to a computer user. Although bus 2502 is illustrated as a single bus, bus 2502 may comprise one or more buses. For example, bus 2502 may include without limitation a control bus by which processor 2504 controls other devices within computer system 2500, an address bus by which processor 2504 specifies memory locations of instructions for execution, or any other type of bus for transferring data or signals between components of computer system 2500.

An input device 2514, including alphanumeric and other keys, is coupled to bus 2502 for communicating information and command selections to processor 2504. Another type of user input device is cursor control 2516, such as a mouse, a trackball, or cursor direction keys for communicating direction information and command selections to processor 2504 and for controlling cursor movement on display 2512. This input device typically has two degrees of freedom in two axes, a first axis (e.g., x) and a second axis (e.g., y), that allows the device to specify positions in a plane.

Computer system 2500 may implement the approaches described herein using customized hard-wired logic, one or more ASICs or FPGAs, firmware and/or program logic or computer software which, in combination with the computer system, causes or programs computer system 2500 to be a special-purpose machine. According to one embodiment, those approaches are performed by computer system 2500 in response to processor 2504 executing one or more sequences of one or more instructions contained in main memory 2506. Such instructions may be read into main memory 2506 from another computer-readable medium, such as storage device 2510. Execution of the sequences of instructions contained in main memory 2506 causes processor 2504 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 2500, various computer-readable media are involved, for example, in providing instructions to processor 2504 for execution. Such a medium may take many forms, including but not limited to, non-volatile media and volatile media. Non-volatile media includes, for example, optical or magnetic disks, such as storage device 2510. Volatile media includes dynamic memory, such as main memory 2506. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 2504 for execution. For example, the instructions may initially be carried on a magnetic disk of a remote computer. The remote computer can load the instructions into its dynamic memory and send the instructions over a telephone line using a modem. A modem local to computer system 2500 can receive the data on the telephone line and use an infra-red transmitter to convert the data to an infra-red signal. An infra-red detector can receive the data carried in the infra-red signal and appropriate circuitry can place the data on bus 2502. Bus 2502 carries the data to main memory 2506, from which processor 2504 retrieves and executes the instructions. The instructions received by main memory 2506 may optionally be stored on storage device 2510 either before or after execution by processor 2504.

Computer system 2500 also includes a communication interface 2518 coupled to bus 2502. Communication interface 2518 provides a two-way data communication coupling to a network link 2520 that is connected to a local network 2522. For example, communication interface 2518 may be an integrated services digital network (ISDN) card or a modem to provide a data communication connection to a corresponding type of telephone line. As another example, communication interface 2518 may be a local area network (LAN) card to provide a data communication connection to a compatible LAN. Wireless links may also be implemented. In any such implementation, communication interface 2518 sends and receives electrical, electromagnetic or optical signals that carry digital data streams representing various types of information.

Network link 2520 typically provides data communication through one or more networks to other data devices. For example, network link 2520 may provide a connection through local network 2522 to a host computer 2524 or to data equipment operated by an Internet Service Provider (ISP) 2526. ISP 2526 in turn provides data communication services through the world wide packet data communication network now commonly referred to as the "Internet" 2528. Local network 2522 and Internet 2528 both use electrical, electromagnetic or optical signals that carry digital data streams.

Computer system 2500 can send messages and receive data, including program code, through the network(s), network link 2520 and communication interface 2518. In the Internet example, a server 2530 might transmit a requested code for an application program through Internet 2528, ISP 2526, local network 2522 and communication interface 2518. The received code may be executed by processor 2504 as it is received, and/or stored in storage device 2510, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable media storing instructions which, when processed by one or more processors, cause:
   generating, on an administrator device that has access rights to a definition server, a graphical user interface that allows a user to:
     specify extension data,
     generate a scan process definition that includes at least the extension data, scan settings data, and destination data that indicates one or more destinations to which scan data generated, based upon the scan settings data, on a scan device that is different than the administrator device, will be sent, and
     cause the scan process definition to be stored on the definition server,
   wherein the extension data specifies one or more of post-scan processing to be performed on the scan data or device settings to be used by the scan device during scanning or printing;
   wherein the extension data includes data that: (a) defines how a graphical user interface at the scan device will be displayed; (b) indicates an external source to which a request for information is to be sent by the scan device; or (c) will be stored in association with the scan data and includes an element name that is used by the scan device to identify the data and send the data to another device.

2. The one or more non-transitory computer-readable media of claim 1, wherein:
   the scan process definition is represented as XML data, and
   the extension data is included in the XML data as an individual hardware vendor (IHV) extension point data.

3. The one or more non-transitory computer-readable media of claim 1, wherein the extension data includes data that will be stored in association with the scan data, wherein the extension data includes an element name that is used by the scan device to identify the data and send the data to another device.

4. The one or more non-transitory computer-readable media of claim 1, wherein the graphical user interface further allows a user to specify the scan settings data and the destination data.

5. The one or more non-transitory computer-readable media of claim 1, wherein the definition server executes on a computing device that is different than the administrator device.

6. The one or more non-transitory computer-readable media of claim 1, wherein the instructions, when executed by the one or more processors, further cause:
   displaying a list of names of a plurality of scan process definitions;

in response to receiving first input that selects a name of a particular scan process definition of the plurality of scan process definitions, retrieving the particular scan process definition from the definition server;

in response to receiving second input, editing the particular scan process definition based on the second input to generate a modified scan process definition;

after generating the modified scan process definition, causing the modified scan process definition to be stored on the definition server.

7. The one or more non-transitory computer-readable media of claim 1, wherein the instructions, when executed by the one or more processors, further cause, prior to generating the graphical user interface:

transmitting a discovery request over a network;

receiving, as a response to the discovery request, information about one or more scan devices;

wherein the information includes two or more of a status of a particular scan device, one or more capabilities of the particular scan device, or device configuration information of the particular scan device.

8. The one or more non-transitory storage media of claim 1, wherein the extension data includes data that defines how a graphical user interface at the scan device will be displayed.

9. The one or more non-transitory storage media of claim 1, wherein the extension data includes data that indicates an external source to which a request for information is to be sent by the scan device.

10. A method comprising:

generating, on an administrator device that has access rights to a definition server, a graphical user interface that allows a user to:

specify extension data, generate a scan process definition that includes at least the extension data, scan settings data, and destination data that indicates one or more destinations to which scan data generated, based upon the scan settings data, on a scan device that is different than the administrator device, will be sent, and cause the scan process definition to be stored on the definition server, wherein the extension data specifies one or more of post-scan processing to be performed on the scan data or device settings to be used by the scan device during scanning or printing;

wherein the extension data includes data that: (a) defines how a graphical user interface at the scan device will be displayed; (b) indicates an external source to which a request for information is to be sent by the scan device; or (c) will be stored in association with the scan data and includes an element name that is used by the scan device to identify the data and send the data to another device.

11. The method of claim 10, wherein:

the scan process definition is represented as XML data, and the extension data is included in the XML data as an individual hardware vendor (IHV) extension point data.

12. The method of claim 10, wherein the extension data includes data that will be stored in association with the scan data, wherein the extension data includes an element name that is used by the scan device to identify the data and send the data to another device.

13. The method of claim 10, wherein the graphical user interface further allows a user to specify the scan settings data and the destination data.

14. The method of claim 10, wherein the definition server executes on a computing device that is different than the administrator device.

15. The method of claim 10, further comprising:

displaying a list of names of a plurality of scan process definitions;

in response to receiving first input that selects a name of a particular scan process definition of the plurality of scan process definitions, retrieving the particular scan process definition from the definition server;

in response to receiving second input, editing the particular scan process definition based on the second input to generate a modified scan process definition;

after generating the modified scan process definition, causing the modified scan process definition to be stored on the definition server.

16. The method of claim 10, further comprising, prior to generating the graphical user interface:

transmitting a discovery request over a network;

receiving, as a response to the discovery request, information about one or more scan devices;

wherein the information includes two or more of a status of a particular scan device, one or more capabilities of the particular scan device, or device configuration information of the particular scan device.

17. The method of claim 10, wherein the extension data includes data that defines how a graphical user interface at the scan device will be displayed.

18. The method of claim 10, wherein the extension data includes data that indicates an external source to which a request for information is to be sent by the scan device.

19. An apparatus comprising:

one or more processors;

one or more storage media storing instructions which, when executed by the one or more processors, further cause:

generating, on an administrator device that has access rights to a definition server, a graphical user interface that allows a user to:

specify extension data, generate a scan process definition that includes at least the extension data, scan settings data, and destination data that indicates one or more destinations to which scan data generated, based upon the scan settings data, on a scan device that is different than the administrator device, will be sent, and cause the scan process definition to be stored on the definition server, wherein the extension data specifies one or more of post-scan processing to be performed on the scan data or device settings to be used by the scan device during scanning or printing;

wherein the extension data includes data that: (a) defines how a graphical user interface at the scan device will be displayed; (b) indicates an external source to which a request for information is to be sent by the scan device; or (c) will be stored in association with the scan data and includes an element name that is used by the scan device to identify the data and send the data to another device.

20. The apparatus of claim 19, wherein:

the scan process definition is represented as XML data, and the extension data is included in the XML data as an individual hardware vendor (IHV) extension point data.

21. The apparatus of claim 19, wherein the extension data includes data that defines how a graphical user interface at the scan device will be displayed.

22. The apparatus of claim 19, wherein the graphical user interface further allows a user to specify the scan settings data and the destination data.

23. The apparatus of claim 19, wherein the definition server executes on a computing device that is different than the administrator device.

24. The apparatus of claim 19, wherein the instructions, when executed by the one or more processors, further cause:
- displaying a list of names of a plurality of scan process definitions;
- in response to receiving first input that selects a name of a particular scan process definition of the plurality of scan process definitions, retrieving the particular scan process definition from the definition server;
- in response to receiving second input, editing the particular scan process definition based on the second input to generate a modified scan process definition;
- after generating the modified scan process definition, causing the modified scan process definition to be stored on the definition server.

25. The apparatus of claim 19, wherein the extension data includes data that will be stored in association with the scan data, wherein the extension data includes an element name that is used by the scan device to identify the data and send the data to another device.

26. The apparatus of claim 19, wherein the extension data includes data that indicates an external source to which a request for information is to be sent by the scan device.

\* \* \* \* \*

UNITED STATES PATENT AND TRADEMARK OFFICE
CERTIFICATE OF CORRECTION

| | | |
|---|---|---|
| PATENT NO. | : 9,277,068 B2 | Page 1 of 1 |
| APPLICATION NO. | : 14/518299 | |
| DATED | : March 1, 2016 | |
| INVENTOR(S) | : Senthil K. Selvaraj, Jiang Hong and Kenji Niimura | |

It is certified that error appears in the above-identified patent and that said Letters Patent is hereby corrected as shown below:

Claims

Column 41

Claim 8, Line 23: Delete "storage media" and insert --computer-readable media--.

Claim 9, Line 26: Delete "storage media" and insert --computer-readable media--.

Signed and Sealed this
Seventeenth Day of May, 2016

Michelle K. Lee
*Director of the United States Patent and Trademark Office*